(12) United States Patent
Yoshioka et al.

(10) Patent No.: US 12,015,124 B2
(45) Date of Patent: Jun. 18, 2024

(54) SOLID-STATE BATTERY AND SOLID-STATE BATTERY GROUP

(71) Applicant: Murata Manufacturing Co., Ltd., Nagaokakyo (JP)

(72) Inventors: Makoto Yoshioka, Nagaokakyo (JP); Kenichi Bando, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 652 days.

(21) Appl. No.: 17/198,394

(22) Filed: Mar. 11, 2021

(65) Prior Publication Data

US 2021/0203008 A1    Jul. 1, 2021

Related U.S. Application Data

(63) Continuation of application No. PCT/JP2019/034799, filed on Sep. 4, 2019.

(30) Foreign Application Priority Data

Sep. 14, 2018 (JP) .................................. 2018-172806

(51) Int. Cl.
  *H01M 10/0585* (2010.01)
  *H01M 10/0525* (2010.01)
  (Continued)

(52) U.S. Cl.
  CPC ... *H01M 10/0585* (2013.01); *H01M 10/0525* (2013.01); *H01M 10/0562* (2013.01);
  (Continued)

(58) Field of Classification Search
  None
  See application file for complete search history.

(56) References Cited

U.S. PATENT DOCUMENTS

2012/0015234 A1    1/2012   Iwaya et al.
2016/0156062 A1*   6/2016   Littau ............... H01M 10/0566
                                                              429/231.95
(Continued)

FOREIGN PATENT DOCUMENTS

JP    2006351326 A    12/2006
JP    2007005279 A     1/2007
(Continued)

OTHER PUBLICATIONS

International Search Report issued for PCT/JP2019/034799, dated Nov. 19, 2019.

(Continued)

*Primary Examiner* — Scott J. Chmielecki
(74) *Attorney, Agent, or Firm* — ArentFox Schiff LLP

(57) ABSTRACT

A solid-state battery including a battery element that includes one or more battery constitutional units, each battery constitutional unit including a positive electrode layer and a negative electrode layer facing each other and a solid electrolyte layer arranged between the positive electrode layer and the negative electrode layer; a first protective layer covering an upper surface of the battery element; and a second protective layer covering a lower surface of the battery element, wherein the first and second protective layers include an insulating substance other than resin.

17 Claims, 16 Drawing Sheets

(51) Int. Cl.
  *H01M 10/0562* (2010.01)
  *H01M 50/117* (2021.01)
  *H01M 50/204* (2021.01)
  *H01M 50/50* (2021.01)
  *H01M 50/512* (2021.01)

(52) U.S. Cl.
  CPC ....... *H01M 50/117* (2021.01); *H01M 50/204* (2021.01); *H01M 50/50* (2021.01); *H01M 50/512* (2021.01); *H01M 2300/0068* (2013.01)

(56) References Cited

U.S. PATENT DOCUMENTS

| | | | | |
|---|---|---|---|---|
| 2016/0248117 | A1* | 8/2016 | Liang | H01M 10/0585 |
| 2018/0083246 | A1* | 3/2018 | Gonda | H01M 50/489 |
| 2018/0183095 | A1* | 6/2018 | Kwon | H01M 4/62 |

FOREIGN PATENT DOCUMENTS

| | | |
|---|---|---|
| JP | 2008186595 A | 8/2008 |
| JP | 2008226728 A | 9/2008 |
| JP | 2010140725 A | 6/2010 |
| JP | 2013016286 A | 1/2013 |
| JP | 2016001601 A | 1/2016 |
| WO | 2014050500 A1 | 4/2014 |
| WO | 2018163514 A1 | 9/2018 |

OTHER PUBLICATIONS

Written Opinion of the International Searching Authority issued for PCT/JP2019/034799, dated Nov. 19, 2019.

* cited by examiner

SOLID-STATE BATTERY AND SOLID-STATE BATTERY GROUP

CROSS REFERENCE TO RELATED APPLICATIONS

The present application is a continuation of International application No. PCT/JP2019/034799, filed Sep. 4, 2019, which claims priority to Japanese Patent Application No. 2018-172806, filed Sep. 14, 2018, the entire contents of each of which are incorporated herein by reference.

FIELD OF THE INVENTION

The present invention relates to a solid-state battery and a solid-state battery group.

BACKGROUND OF THE INVENTION

In recent years, demand for batteries as power sources for portable electronic devices such as mobile phones and portable personal computers has increased significantly. In batteries used for such purposes, an electrolyte (electrolytic solution) such as an organic solvent has been conventionally used as a medium for moving ions. However, in the battery having the above configuration, there is a risk that the electrolytic solution may leak out. Furthermore, the organic solvent and the like used in the electrolytic solution are flammable substances. Thus, it is required to improve safety for the battery.

Accordingly, in order to improve safety for the battery, research on a solid-state battery using a solid electrolyte as the electrolyte instead of the electrolytic solution is in progress.

For example, Patent Documents 1 to 3 disclose a technique to form a protective layer containing a polymer compound on the outermost surface of a battery element having a positive electrode and a negative electrode and a solid electrolyte between them, so as to electrically and physically protect the solid-state battery.

Patent Document 1: Japanese Patent Application Laid-Open No. 2008-186595
Patent Document 2: Japanese Patent Application Laid-Open No. 2006-351326
Patent Document 3: Japanese Patent Application Laid-Open No. 2016-001601

SUMMARY OF THE INVENTION

However, the inventors of the present invention have found that when the solid-state battery has the protective layer containing the polymer compound on the surface of the battery element, the protective layer expands and cracks and/or falls off due to the polymer compound adsorbing water or gas, and thus the function as the protective layer is lost and battery performance deteriorates.

The inventors of the present invention have also found that when the surface of the battery element in the solid-state battery is just covered with the protective film containing a polymer compound, the protective layer is likely to fall off due to strong vibration, impact, and the like on the battery, and thus the function as the protective layer will be lost and the battery performance will deteriorate.

The inventors of the present invention have further found that when a plurality of conventional solid-state batteries is arranged adjacent to a vertical in-plane direction M perpendicular to a stacking direction L of a positive electrode layer, a negative electrode layer, and a solid electrolyte layer, a short circuit can occur between two adjacent solid-state batteries. Specifically, for example, as illustrated in FIG. 23, when a plurality of conventional solid-state batteries (800, 900) was arranged adjacent to each other in the in-plane direction M perpendicular to the stacking direction L, volume expansions 801, 901 occurred in the solid-state batteries 800, 900, respectively, in the direction M between the two adjacent solid-state batteries. Thus, the two solid-state batteries 800, 900 adjacent in the direction M pressed against each other, and it was possible for a short circuit to occur. It is conceivable that the short circuit is caused by the volume expansion of the positive electrode layer and the negative electrode layer accompanying charging and discharging in each solid-state battery.

It is an object of the present invention to provide a solid-state battery having a protective layer that is less likely to adsorb water and gas and has high joint strength with a battery element as compared to a protective layer containing a polymer compound.

It is also an object of the present invention to provide a solid-state battery having a protective layer that is less likely to adsorb water and gas and has high joint strength with a battery element as compared to a protective layer containing a polymer compound, and that is also capable of suppressing a short circuit due to volume expansion even if it is arranged adjacent in the in-plane direction M perpendicular to the stacking direction L of a positive electrode layer, a negative electrode layer, and a solid electrolyte layer.

The solid-state battery according to an aspect of the present invention includes a battery element having one or more battery constitutional units, each battery constitutional unit including a positive electrode layer and a negative electrode layer facing each other and a solid electrolyte layer arranged between the positive electrode layer and the negative electrode layer; a first protective layer covering an upper surface of the battery element; and a second protective layer covering a lower surface of the battery element, wherein the first and second protective layers include an insulating substance other than resin.

A solid-state battery according to the present invention has a protective layer that is less likely to adsorb water and gas and has high joint strength with a battery element as compared to a protective layer containing a polymer compound. Consequently, in the solid-state battery according to the present invention, the protective layer is less likely to crack and fall off due to adsorption of water and gas, and is less likely to fall off due to vibration, impact, and the like as compared to the protective layer containing a polymer compound. Therefore, the solid-state battery according to the present invention can further suppress deterioration of battery performance.

DETAILED DESCRIPTION OF THE INVENTION

[Solid-State Battery]

Figure 1A:
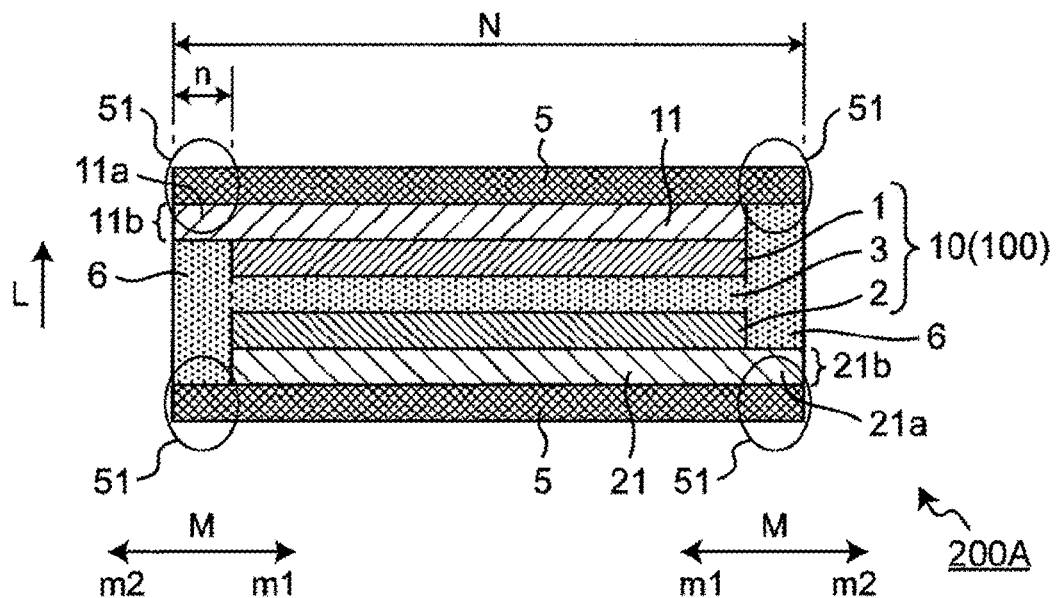
FIG. 1A is a schematic sectional view illustrating an example of a solid-state battery according to the present invention having a single battery structure in a battery element.

The present invention provides a solid-state battery. The term "solid-state battery" as used herein refers in a broad sense to a battery in which its components (particularly an electrolyte layer) are constituted of solids, and refers in a narrow sense to an "all-solid-state battery" in which its components (particularly all the components) are constituted of solids. The "solid-state battery" as used herein includes what is called a "secondary battery" capable of repeating charging and discharging, and a "primary battery" capable of discharging only. The "solid-state battery" is preferably the "secondary battery". The "secondary battery" is not overly limited by its name and may include, for example, a "power storage device" and the like.

The term "plan view" as used herein refers to a state (top view or bottom view) in which an object is viewed from above or below along a thickness direction based on a stacking direction L of layers to be described later that constitute the solid-state battery. Further, the "sectional view" as used herein refers to a sectional state (sectional view) when viewed from a direction substantially perpendicular to the thickness direction based on the stacking direction L of the layers to be described later that constitute the solid-state battery. The "vertical direction" and "horizontal direction" as used directly or indirectly herein correspond to a vertical direction and a horizontal direction in the drawings, respectively. Unless otherwise specified, the same reference sign or symbol indicates the same member or part or the same meaning and content. In one preferred embodiment, it can be considered that a vertical downward direction (that is, the direction in which gravity acts) corresponds to a "downward direction" and the opposite direction corresponds to an "upward direction".

Figure 2:
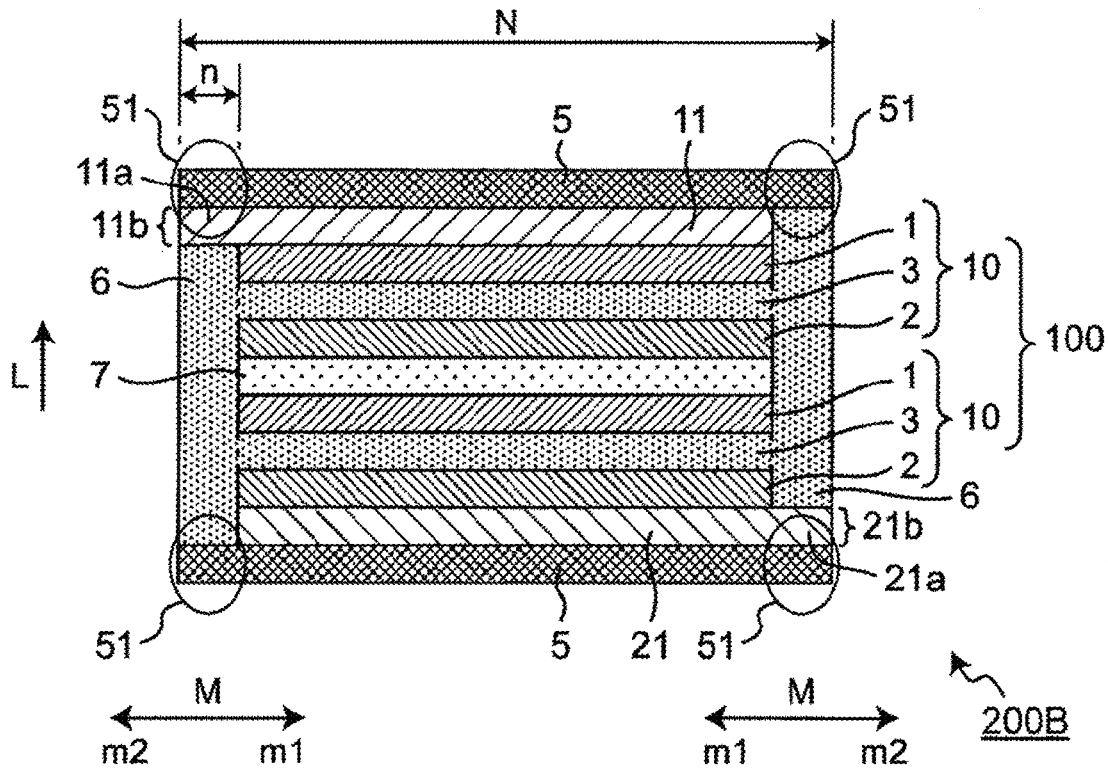
FIG. 2 is a schematic sectional view illustrating an example of the solid-state battery according to the present invention having a series multiple battery structure in the battery element.
Figure 3:
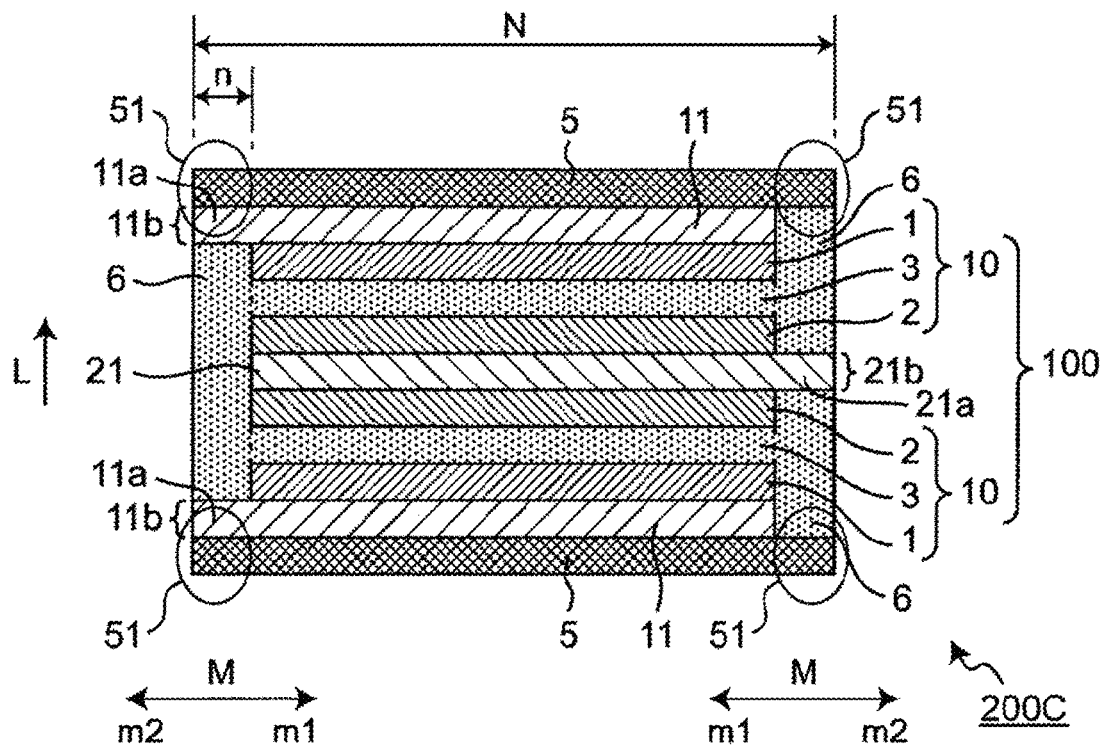
FIG. 3 is a schematic sectional view illustrating an example of the solid-state battery according to the present invention having a parallel multiple battery structure in the battery element.
Figure 4:
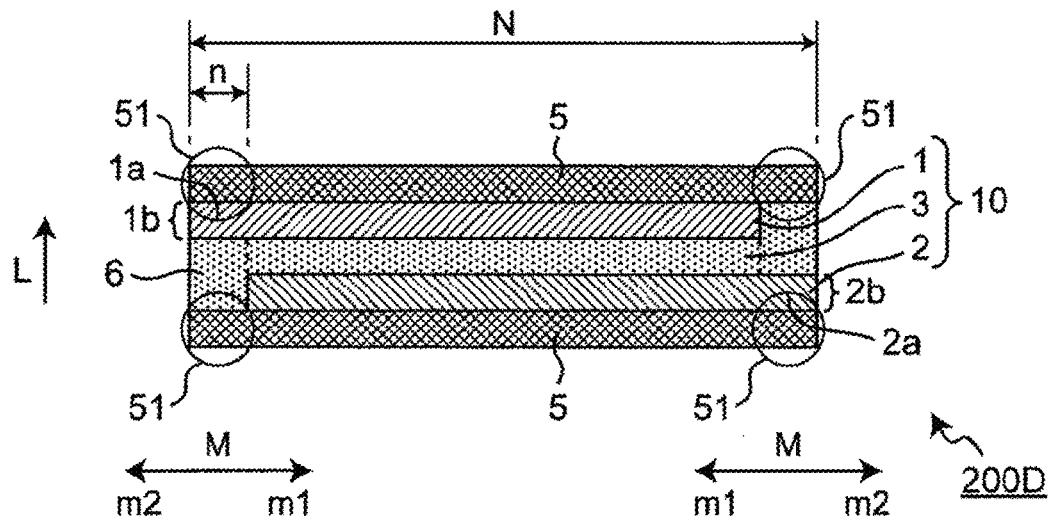
FIG. 4 is a schematic sectional view illustrating another example of the solid-state battery according to the present invention having the single battery structure in the battery element.
Figure 5:
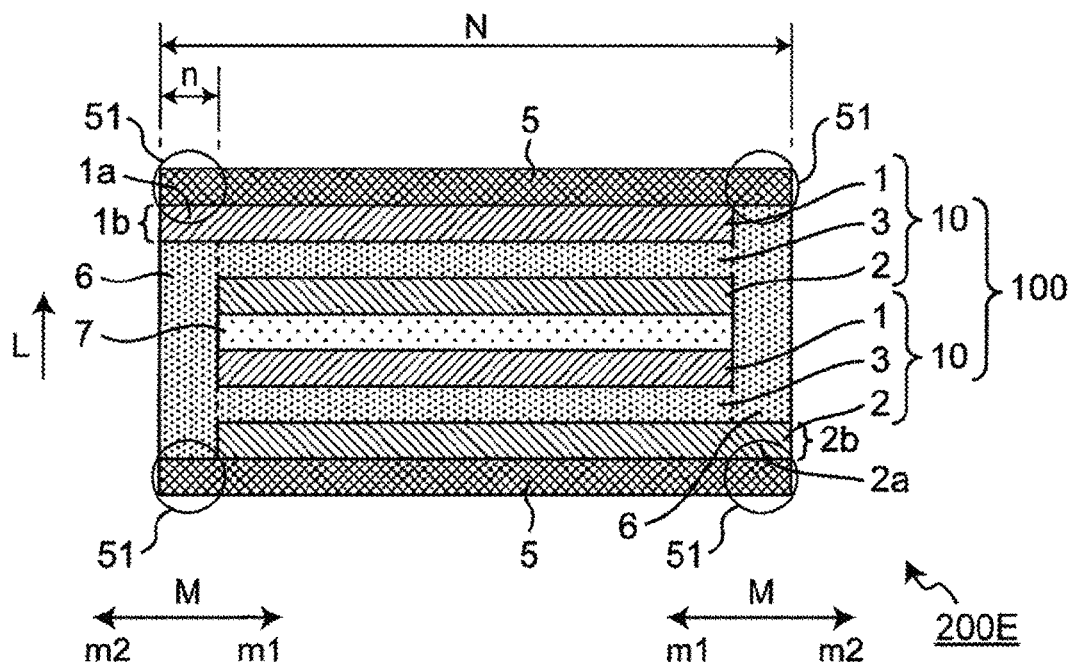
FIG. 5 is a schematic sectional view illustrating another example of the solid-state battery according to the present invention having the series multiple battery structure in the battery element.
Figure 6:
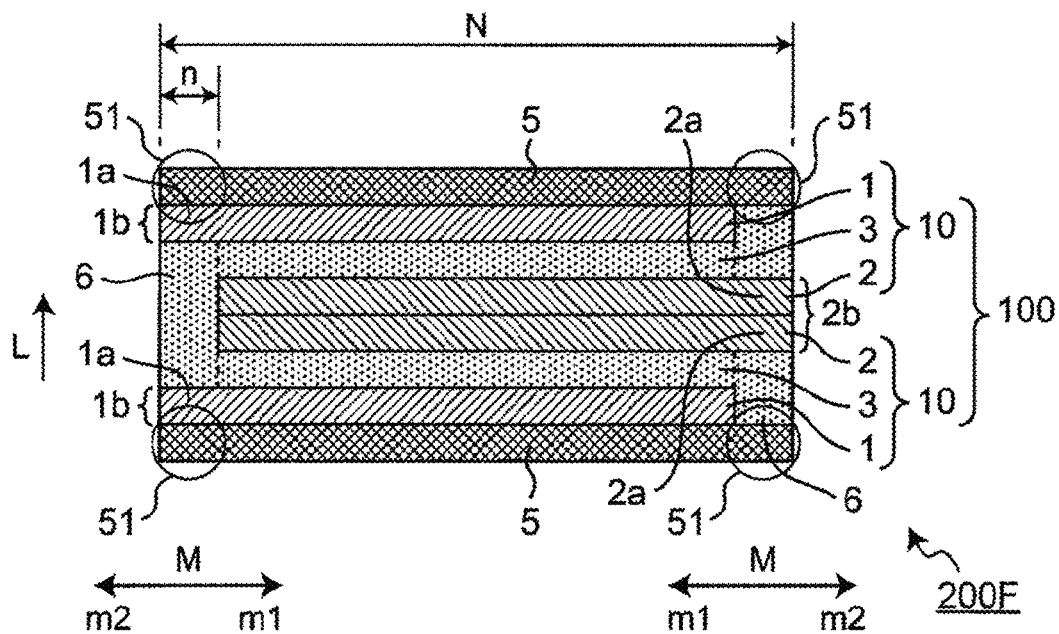
FIG. 6 is a schematic sectional view illustrating another example of the solid-state battery according to the present invention having the parallel multiple battery structure in the battery element.

The solid-state battery according to the present invention has, for example, a layered structure (particularly a stacked structure) as denoted by reference numerals "200A", "200B", "200C", "200D", "200E", and "200F" (hereinafter, simply referred to as "200A to 200F") in FIGS. 1A, 2, 3, 4, 5, and 6, respectively. The solid-state battery 200A to 200F according to the present invention includes a battery element 100 and a protective layer 5 that covers upper and lower surfaces of the battery element 100. FIG. 1A is a schematic sectional view illustrating an example of the solid-state battery according to the present invention having a single battery structure in the battery element 100. FIG. 2 is a schematic sectional view illustrating an example of the solid-state battery according to the present invention having a series multiple battery structure in the battery element 100. FIG. 3 is a schematic sectional view illustrating an example of the solid-state battery according to the present invention having a parallel multiple battery structure in the battery element 100. FIG. 4 is a schematic sectional view illustrating another example of the solid-state battery according to the present invention having a single battery structure in the battery element 100. The solid-state battery of FIG. 4 has a structure similar to that of the solid-state battery of FIG. 1A except that a positive electrode layer 1 does not have a positive electrode current collecting layer 11 and has an electrical connection portion 1a, and a negative electrode layer 2 does not have a negative electrode current collecting layer 21 and has an electrical connection portion 2a. FIG. 5 is a schematic sectional view illustrating another example of the solid-state battery according to the present invention having the series multiple battery structure in the battery element 100. The solid-state battery of FIG. 5 has a structure similar to that of the solid-state battery of FIG. 2 except that the positive electrode layer 1 does not have the positive electrode current collecting layer 11 and has the electrical connection portion 1a, and the negative electrode layer 2 does not have the negative electrode current collecting layer 21 and has the electrical connection portion 2a. FIG. 6 is a schematic sectional view illustrating another example of the solid-state battery according to the present invention having the parallel multiple battery structure in the battery element 100. The solid-state battery of FIG. 6 has a structure similar to that of the solid-state battery of FIG. 3 except that the positive electrode layer 1 does not have the positive electrode current collecting layer 11 and has the electrical connection portion 1a, and the negative electrode layer 2 does not have the negative electrode current collecting layer 21 and has the electrical connection portion 2a.

The battery element 100 is a main body part of the solid-state battery covered with the protective layer 5 and a side surface reinforcing portion 6, which will be described later, and includes one or more battery constitutional units 10. The battery constitutional unit 10 means a smallest constitutional unit capable of performing a battery function, and includes one positive electrode layer 1 and one negative electrode layer 2 facing each other, and one solid electrolyte layer 3 arranged between the positive electrode layer 1 and the negative electrode layer 2.

The battery element 100 may have a single battery structure having only one battery constitutional unit 10, as illustrated in FIGS. 1A and 4, for example. Further, for example, as illustrated in FIGS. 2, 3, 5 and 6, the battery element 100 may have a multiple battery structure having two or more battery constitutional units 10 stacked along the stacking direction L of each layer constituting each battery constitutional unit 10. When having a multiple battery structure, the battery element 100 may have, as illustrated in FIGS. 2 and 5 for example, a series structure in which two or more battery constitutional units 10 (or respective layers constituting the battery constitutional units) are electrically arranged in series, or may have, as illustrated in FIGS. 3 and 6 for example, a parallel structure in which two or more battery constitutional units 10 (or respective layers constituting the battery constitutional units) are electrically arranged in parallel.

From the viewpoint of suppressing deterioration of the battery in a longer period of time, it is preferable that all the layers constituting the battery element 100 be integrally sintered as sintered bodies together between two adjacent layers. The part that all the layers are integrally sintered as sintered bodies together between two adjacent layers means that the two adjacent layers are joined by sintering. Specifically, the two adjacent layers are both sintered bodies, but are integrally sintered. Note that the two adjacent layers do not have to be all strictly integrated, and a part of the layers may be not integrated. The two adjacent layers are only required to be integrated as a whole.

For example, as illustrated in FIGS. 1A, 2 and 3, when the battery element 100 has one or more battery constitutional units 10 and the positive electrode layer 1 and the negative electrode layer 2 have the positive electrode current collecting layer 11 and the negative electrode current collecting layer 21, respectively, it is preferable that the positive electrode current collecting layer 11, the positive electrode layer 1, the solid electrolyte layer 3, the negative electrode layer 2, and the negative electrode current collecting layer 21 employ an integrally sintered structure in a predetermined stacking order.

Further, for example, as illustrated in FIGS. 4 to 6, when the battery element 100 has one or more battery constitutional units 10, and the positive electrode layer 1 and the negative electrode layer 2 do not have the positive electrode current collecting layer 11 and the negative electrode current collecting layer 21, respectively, it is preferable that the positive electrode layer 1, the solid electrolyte layer 3, and the negative electrode layer 2 employ an integrally sintered structure in a predetermined stacking order.

Note that when the battery element 100 has the series multiple battery structure and has a connection layer 7 between the battery constitutional units 10 as illustrated in FIGS. 2 and 5, it is preferable that the connection layer 7 be also joined to the adjacent layer by sintering, similarly to other layers.

The positive electrode layer 1 and the negative electrode layer 2 may have the positive electrode current collecting layer 11 and the negative electrode current collecting layer 21, respectively, as illustrated in FIGS. 1A, 2 and 3, or they do not need to have the positive electrode current collecting layer 11 and the negative electrode current collecting layer 21, respectively, as illustrated in FIGS. 4 to 6.

When the positive electrode layer 1 and the negative electrode layer 2 have the positive electrode current collecting layer 11 and the negative electrode current collecting layer 21, respectively, as illustrated in FIGS. 1A, 2 and 3, the positive electrode current collecting layer 11 and the negative electrode current collecting layer 21 are provided with electrical connection portions 11a and 21a, respectively, for electrical connection to the outside. The electrical connection portions 11a and 21a will be also referred to as electronic input and output portions for inputting and outputting electrons.

When the positive electrode layer 1 and the negative electrode layer 2 do not have the positive electrode current collecting layer 11 and the negative electrode current collecting layer 21, respectively, as illustrated in FIGS. 4 to 6, the positive electrode layer 1 and the negative electrode layer 2 are provided with electrical connection portions 1a and 2a, respectively, for electrical connection to the outside. The electrical connection portions 1a and 2a will be also referred to as an electron input and output portion for inputting and outputting electrons.

The solid-state batteries illustrated in FIGS. 2, 3, 5, and 6 include two battery constitutional units 10 in the battery element 100, but the number of battery constitutional units 10 included in one solid-state battery is not particularly limited, and for example, the number may be one to 100, particularly one to 50.

The solid-state battery according to the present invention may have any shape in a plan view, and usually has a rectangular shape. The rectangular shape includes squares and rectangles.

(Positive Electrode Layer and Negative Electrode Layer)

The positive electrode layer 1 is what is called a positive electrode active material layer, and may additionally have a positive electrode current collecting layer 11. When the positive electrode layer 1 has the positive electrode current collecting layer 11, the positive electrode layer 1 may be provided on one side of the positive electrode current collecting layer 11 or may be provided on both sides. The positive electrode layer 1 is constituted of a sintered body containing positive electrode active material particles, and may usually be constituted of a sintered body containing positive electrode active material particles, electron conductive material particles, and solid electrolyte particles contained in the solid electrolyte layer 3.

The negative electrode layer 2 is what is called a negative electrode active material layer, and may additionally have a negative electrode current collecting layer 12. When the negative electrode layer 2 has the negative electrode current collecting layer 21, the negative electrode layer 2 may be provided on one side of the negative electrode current collecting layer 21 or may be provided on both sides. The negative electrode layer 2 is constituted of a sintered body containing negative electrode active material particles, and may usually be constituted of a sintered body containing negative electrode active material particles, the electron conductive material particles, and the solid electrolyte particles contained in the solid electrolyte layer 3.

The positive electrode active material contained in the positive electrode layer and the negative electrode active material contained in the negative electrode layer are substances involved in exchange of electrons in the solid-state battery, and ions contained in a solid electrolyte material constituting the solid electrolyte layer move (being conducted) between the positive electrode and the negative electrode and exchange electrons, thereby performing charging and discharging. The positive electrode layer and the negative electrode layer are particularly preferably layers capable of occluding and releasing lithium ions. That is, the solid-state battery according to the present invention is preferably a solid-state secondary battery in which lithium ions move between the positive electrode and the negative electrode through the solid electrolyte layer to charge and discharge the battery.

The positive electrode active material contained in the positive electrode layer is not particularly limited, and for example, at least one selected from the group consisting of a lithium-containing phosphoric acid compound having a NASICON-type structure, a lithium-containing phosphoric acid compound having an olivine-type structure, a lithium-containing layered oxide, and a lithium-containing oxide having a spinel-type structure, and the like may be mentioned. An example of the lithium-containing phosphoric acid compound having a NASICON-type structure is $Li_3V_2(PO_4)_3$ or the like. Examples of the lithium-containing phosphoric acid compound having an olivine-type structure include $Li_3Fe_2(PO_4)_3$, $LiMnPO_4$, and the like. Examples of the lithium-containing layered oxide include $LiCoO_2$, $LiCo_{1/3}Ni_{1/3}Mn_{1/3}O_2$, and the like. Examples of the lithium-containing oxide having a spinel-type structure include $LiMn_2O_4$, $LiNi_{0.5}Mn_{1.5}O_4$, and the like.

The negative electrode active material contained in the negative electrode layer is not particularly limited, and for example, at least one selected from the group consisting of an oxide containing at least one element selected from the group consisting of Ti, Si, Sn, Cr, Fe, Nb, and Mo, a graphite-lithium compound, a lithium alloy, a lithium-containing phosphoric acid compound having a NASICON-type structure, a lithium-containing phosphoric acid compound having an olivine-type structure, and a lithium-containing oxide having a spinel-type structure and the like may be mentioned. An example of the lithium alloy is Li—Al and the like. An example of the lithium-containing phosphoric acid compound having a NASICON-type structure is $Li_3V_2(PO_4)_3$ or the like. An example of the lithium-containing phosphoric acid compound having an olivine-type structure is $Li_3Fe_2(PO_4)_3$, and the like. An example of the lithium-containing oxide having a spinel-type structure is $Li_4Ti_5O_{12}$, and the like.

The electron conductive material contained in the positive electrode layer and the negative electrode layer is not particularly limited, and examples thereof include metal materials such as silver, palladium, gold, platinum, aluminum, copper, and nickel, and carbon materials. In particular, carbon is preferable because it does not easily react with the positive electrode active material, the negative electrode active material, and the solid electrolyte material, and is effective in reducing internal resistance of the solid-state battery.

The solid electrolyte material contained in the positive electrode layer and the negative electrode layer may be selected from, for example, materials similar to solid electrolyte materials that can be contained in the solid electrolyte layer that will be described later.

The positive electrode layer and the negative electrode layer may each independently contain a sintering additive. The sintering additive is not particularly limited, and can be, for example, at least one selected from the group consisting of lithium oxide, sodium oxide, potassium oxide, boron oxide, silicon oxide, bismuth oxide, and phosphorus oxide.

When the positive electrode layer 1 and the negative electrode layer 2 do not have the positive electrode current collecting layer 11 and the negative electrode current collecting layer 21, which will be described later, respectively, as illustrated in FIGS. 4 to 6, the positive electrode layer 1 and the negative electrode layer 2 have electrical connection portions 1a and 2a, respectively, for electrical connection to the outside and are configured to be electrically connectable to terminals. The electrical connection portions 1a and 2a have exposed portions 1b and 2b that are not covered with the protective layer 5 or the side surface reinforcing portion 6, which will be described later, and are usually provided at ends of the positive electrode layer 1 and the negative electrode layer 2, respectively.

The thicknesses of the positive electrode layer and the negative electrode layer are not particularly limited, and may each be, for example, 2 μm or more and 50 μm or less, particularly 5 μm or more and 30 μm or less, independently of each other.

(Positive Electrode Current Collecting Layer and Negative Electrode Current Collecting Layer)

The positive electrode layer 1 and the negative electrode layer 2 may have the positive electrode current collecting layer 11 and the negative electrode current collecting layer 21, respectively, on opposite sides of the solid electrolyte layer 3. When the positive electrode layer 1 and the negative electrode layer 2 have the positive electrode current collecting layer 11 and the negative electrode current collecting layer 21, respectively, as illustrated in FIGS. 1A, 2 and 3, the positive electrode current collecting layer 11 and the negative electrode current collecting layer 21 have electrical connection portions 11a and 21a, respectively, for electrical connection to the outside, and are configured to be electrically connectable to terminals. The electrical connection portions 11a and 21a have exposed portions 11b and 21b that are not covered with the protective layer 5 or the side surface reinforcing portions 6, which will be described later, and are usually provided at ends of the positive electrode current collecting layer 11 and the negative electrode current collecting layer 21, respectively.

The positive electrode current collecting layer 11 and the negative electrode current collecting layer 21 may each have a foil form, but from the viewpoint of reducing manufacturing cost of the solid-state battery by integral firing and reducing internal resistance of the solid-state battery, it is preferable to have the form of a sintered body.

When the positive electrode current collecting layer 11 and the negative electrode current collecting layer 21 have the form of a sintered body, they may be constituted of, for example, a sintered body containing electron conductive material particles and a sintering additive. The electron conductive material contained in the positive electrode current collecting layer 11 and the negative electrode current collecting layer 21 may be selected from, for example, materials similar to the electron conductive material that can be contained in the positive electrode layer and the negative electrode layer. The sintering additive contained in the positive electrode current collecting layer 11 and the negative electrode current collecting layer 21 may be selected from, for example, materials similar to the sintering additive that can be contained in the positive electrode layer and the negative electrode layer.

The thicknesses of the positive electrode current collecting layer and the negative electrode current collecting layer are not particularly limited, and may each be, for example, 1 μm or more and 5 μm or less, particularly 1 μm or more and 3 μm or less, independently of each other.

(Solid Electrolyte Layer)

The solid electrolyte layer 3 is constituted of a sintered body containing solid electrolyte particles. The material of the solid electrolyte particles (that is, the solid electrolyte material) is not particularly limited as long as it can provide ions that can move between the positive electrode layer and the negative electrode layer. Examples of the solid electrolyte material include a lithium-containing phosphoric acid compound having a NASICON structure, an oxide having a perovskite structure, an oxide having a garnet type or a garnet type similar structure, and the like. As the lithium-containing phosphoric acid compound having a NASICON structure, $Li_xM_y(PO_4)_3$ may be mentioned (where $1 \leq x \leq 2$, $1 \leq y \leq 2$, and M is at least one selected from the group consisting of Ti, Ge, Al, Ga, and Zr). An example of the lithium-containing phosphoric acid compound having a NASICON structure is $Li_{1.2}Al_{0.2}Ti_{1.8}(PO_4)_3$, or the like. An example of the oxide having a perovskite structure is $La_{0.55}Li_{0.35}TiO_3$ or the like. An example of the oxide having a garnet type or a garnet type similar structure is $Li_7La_3Zr_2O_{12}$ or the like.

The solid electrolyte layer may contain a sintering additive. The sintering additive contained in the solid electrolyte layer may be selected from, for example, materials similar to the sintering additive that can be contained in the positive electrode layer and the negative electrode layer.

The thickness of the solid electrolyte layer is not particularly limited, and may be, for example, 1 μm to 15 μm, particularly 1 μm to 5 μm.

(Protective Layer)

The protective layer 5 is formed on the upper and lower surfaces of the battery element 100 in the solid-state battery, and is for electrically, physically, and chemically protecting the battery element 100. In the present invention, the protective layer 5 includes an insulating substance other than resin. The Insulating substance means a material that does not have ionic conductivity or electronic conductivity. Therefore, the insulating substance other than resin is an insulating inorganic substance having neither ionic conductivity nor electron conductivity. The inorganic substance having no ionic conductivity means an inorganic substance having ionic conductivity of $1 \times 10^{-7}$ S/cm or less. From the viewpoint of suppressing deterioration of the battery in a longer period of time, the ionic conductivity is preferably $1 \times 10^{-12}$ S/cm or less. The ionic conductivity of the inorganic substance having no ionic conductivity is usually $1 \times 10^{-18}$ S/cm or more. The inorganic substance having no electron conductivity means an inorganic substance having electron conductivity of $1 \times 10^{-7}$ S/cm or less. From the viewpoint of suppressing deterioration of the battery in a longer period of time, the electron conductivity is preferably $1 \times 10^{-12}$ S/cm or less. The electron conductivity of an inorganic substance having no electron conductivity is usually $1 \times 10^{-18}$ S/cm or more.

Since the protective layer 5 includes such an insulating substance other than resin, the protective layer 5 has even more excellent moisture resistance, environmental resistance, and durability. Specifically, the protective layer 5 can be made as a protective layer that is difficult to adsorb, absorb and allow permeation of moisture and gas (carbon dioxide) and has high joint strength with a battery element compared to a protective layer containing resin (for example, a polymer compound). Consequently, in the solid-state battery according to the present invention, the protective layer 5 is less likely to crack and fall off based on expansion due to adsorption and absorption of water and gas (carbon dioxide) and is less likely to fall off due to vibration, impact, and the like as compared to the protective layer containing a polymer compound. Further, the protective layer 5 is less likely to allow permeation of moisture and gas (carbon dioxide) as compared to the protective layer containing a polymer compound. Consequently, the solid-state battery according to the present invention can further suppress deterioration of battery performance. In the battery element, the positive electrode layer, the negative electrode layer, and the solid electrolyte layer have ionic conductivity and conduct lithium or sodium, but the battery performance tends to deteriorate due to adsorption and absorption of water and gas (carbon dioxide). The protective layer containing resin (for example, a polymer compound) easily adsorbs, absorbs, and allows permeation of moisture and gas (carbon dioxide) due to presence of the resin. If the protective layer easily adsorbs and absorbs water and gas (carbon dioxide), a crack and falling off based on expansion of the protective layer are likely to occur, and falling off due to vibration, impact, and the like is also likely to occur. If a crack and/or falling off occurs in the protective layer, the positive electrode layer, the negative electrode layer, and the solid electrolyte layer adsorb and absorb water and gas (carbon dioxide). Further, if the protective layer easily allows permeation of moisture and gas (carbon dioxide), the moisture and gas (carbon dioxide) invade the inside of the battery element, and the positive electrode layer, the negative electrode layer, and the solid electrolyte layer adsorb and absorb moisture and gas (carbon dioxide). Consequently, the battery performance deteriorates.

Examples of the insulating substance other than the resin constituting the protective layer 5 include glass and ceramics. Examples of the glass include quartz glass ($SiO_2$), composite oxide-based glass that is a combination of $SiO_2$ and one selected from at least one of PbO, $B_2O_3$, MgO, ZnO, $Bi_2O_3$, $Na_2O$, and $Al_2O_3$, and the like. Examples of ceramics include alumina, cordierite, mullite, steatite, and forsterite. The protective layer 5 may be constituted of one or more materials selected from the group consisting of these substances. The protective layer 5 may contain a material having electron conductivity (for example, metal) as long as the battery element 100 is not short-circuited. When the protective layer 5 contains a material having electron conductivity, the content ratio of the electron conductive material may be, for example, 1% by volume or less. Because the protective layer 5 contains an electron conductive material (for example, metal), the heat generated by battery reaction can be smoothly released to the outside.

The protective layer 5 is constituted of a sintered body containing insulating substance particles other than the above-described resin. The sintered body constituting the protective layer 5 in the present invention has pores among the insulating substance particles, but also has density to an extent that allows suppressing adsorption, absorption, and permeation of moisture and gas (carbon dioxide) in its thickness direction (for example, the stacking direction L).

It is not strictly unacceptable for the protective layer 5 to contain resin such as a polymer compound, and the polymer compound used in the production and/or a thermal decomposition product thereof may remain. The content of residues of the polymer compound and the thermal decomposition product thereof, and the like in the protective layer is usually 0.1% by weight or less, particularly 0.01% by weight or less with respect to the total amount of the protective layer. Note that also in the positive electrode layer, the positive electrode current collecting layer, the negative electrode layer, the negative electrode current collecting layer, the solid electrolyte layer, and the side surface reinforcing portion, which will be described later, residues may remain as in the protective layer. For example, the content of residues in each layer or each portion of the positive electrode layer, the positive electrode current collecting layer, the negative electrode layer, the negative electrode current collecting layer, the solid electrolyte layer, and the side surface reinforcing portion, as a value with respect to the total amount of each layer, may be within a range similar to the range of the content of residues in the protective layer.

Porosity of the protective layer 5 may be, for example, 0.1% by volume to 20% by volume, particularly 1% by volume to 10% by volume. For the porosity, values measured by a weight porosity method, a calculated tomography method using CT scan, an immersion method, or the like are used.

Oxygen permeability of the protective layer 5 in the thickness direction may be, for example, $10^{-1}$ cc/m²/day/atmospheric pressure or less, particularly $10^{-3}$ cc/m²/day/atmospheric pressure or less.

$H_2O$ permeability in the thickness direction of the protective layer 5 may be, for example, $10^{-2}$ g/m²/day or less, particularly $10^{-4}$ g/m2/day or less. For the $H_2O$ permeability, values measured at 25° C. by a carrier gas method, a compression method, and a Ca corrosion method are used.

A thickness of a thickest portion of the protective layer 5 is preferably 500 μm or less, more preferably 100 μm or less, still more preferably 50 μm or less, and most preferably 20 μm or less, from the viewpoint of further suppressing deterioration of the battery performance. The protective layer 5 preferably has an average thickness of 1 μm or more, more preferably 5 μm or more, from the viewpoint of further suppressing deterioration of the battery performance due to adsorption, absorption, permeation, and the like of moisture and gas (carbon dioxide).

For the thickness and average thickness of the thickest portion of the protective layer 5, the maximum thickness and the average thickness for thicknesses at any 100 points are used, respectively.

The protective layer 5 covers the upper and lower surfaces of the battery element 100. The protective layer 5 may be in direct contact with the upper and lower surfaces of the battery element 100 covered with the protective layer 5 as illustrated in FIGS. 1A and 2 to 6, or may be in indirect contact thereto with another layer (for example, an inorganic layer or a metal layer) interposed therebetween. The part that the protective layer 5 is in direct contact with the upper and lower surfaces of the battery element means that the protective layer 5 is in direct contact with the upper and lower surfaces of the battery element without an interposition of the another layer, the resin layer, and the liquid electrolyte between the protective layer 5 and the battery element. In the present invention, the protective layer 5 is preferably in direct contact with the surface of the battery element 100 covered with the protective layer 5 for the following reasons (1) and (2): reason (1) the protective layer 5 is more difficult to fall off even when a strong vibration and/or impact is applied to the solid-state battery, and deterioration of the battery performance accompanying falling off of the protective layer is even more difficult to occur; and reason (2) the absence of other layers that do not exhibit a battery function reduces the volume of the solid-state battery and thus improves energy density of the battery.

It is preferable that the protective layer 5 be integrally sintered as sintered bodies together with the upper and lower surfaces of the battery element 100 covered with the protective layer 5. The part that the protective layer 5 is integrally sintered as sintered bodies together with the upper and lower surfaces of the battery element 100 covered with the protective layer 5 means that the protective layer 5 is joined by sintering to the upper and lower surfaces of the battery element 100 covered with the protective layer 5. Specifically, the protective layer 5 and the upper and lower surfaces of the battery element 100 covered with the protective layer 5 are both sintered bodies, but are integrally sintered. For example, the protective layer 5 and the battery element 100 preferably have an integrally sintered structure. Note that the protective layer 5 and the upper and lower surfaces of the battery element 100 covered with the protective layer 5 do not have to be all strictly integrated, and a part thereof may be not integrated. The protective layer 5 and the upper and lower surfaces of the battery element 100 covered with the protective layer 5 may be integrated as a whole.

The upper and lower surfaces of the battery element 100 covered with the protective layer 5 are usually surfaces of outermost layers of the battery element 100. The outermost layers of the battery element 100 are an uppermost layer arranged at a top and a lowermost layer arranged at a bottom among the layers 100 constituting the battery element. The surfaces of the outermost layers are an upper surface of the uppermost layer and a lower surface of the lowermost layer.

As illustrated in FIGS. 1A, 2, and 3, when the positive electrode layer 1 and the negative electrode layer 2 have the positive electrode current collecting layer 11 and the negative electrode current collecting layer 21, respectively, the outermost layers covered with the protective layer 5 are usually selected from the positive electrode current collecting layer 11 and the negative electrode current collecting layer 21. In FIGS. 1A and 2, the outermost layers covered with the protective layer 5 are the positive electrode current collecting layer 11 as the uppermost layer and the negative electrode current collecting layer 21 as the lowermost layer. In FIG. 3, the outermost layers covered with the protective layer 5 is the positive electrode current collecting layer 11 as the uppermost layer and the positive electrode current collecting layer 11 as the lowermost layer.

As illustrated in FIGS. 4 to 6, when the positive electrode layer 1 and the negative electrode layer 2 do not have the positive electrode current collecting layer and the negative electrode current collecting layer, respectively, the outermost layers covered with the protective layer 5 are usually selected from the positive electrode layer 1 and the negative electrode layer 2. In FIGS. 4 and 5, the outermost layers covered with the protective layer 5 are the positive electrode layer 1 as the uppermost layer and the negative electrode layer 2 as the lowermost layer. In FIG. 6, the outermost layers covered with the protective layer 5 are the positive electrode layer 1 as the uppermost layer and the positive electrode layer 1 as the lowermost layer.

Figure 1B:
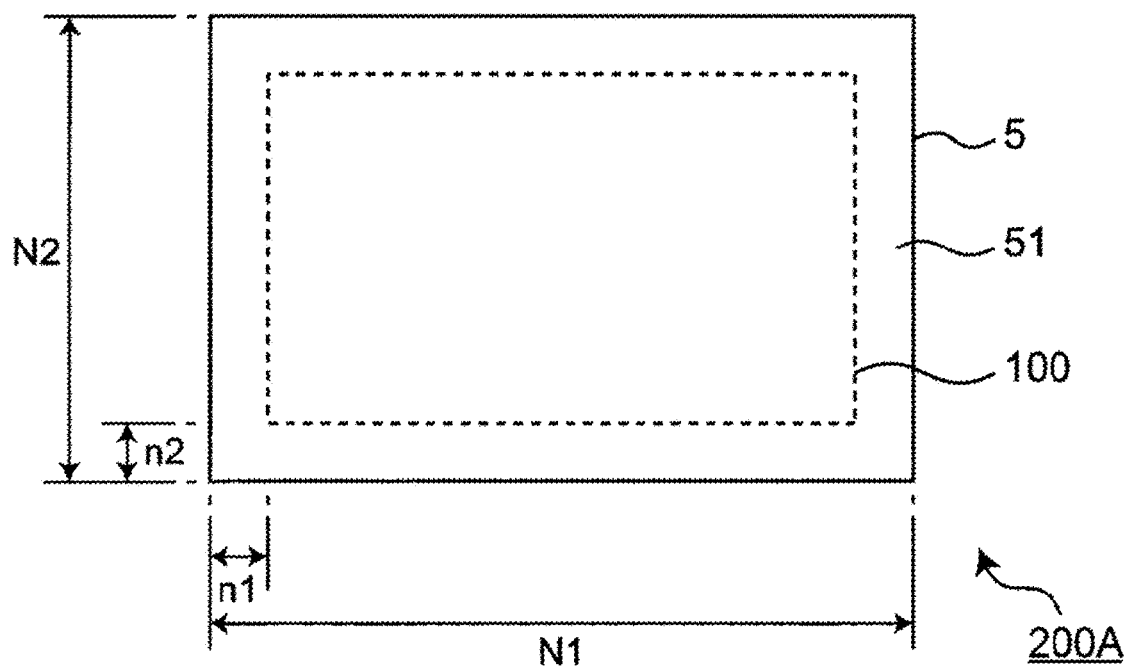
FIG. 1B is a schematic plan view of the solid-state battery according to the present invention illustrated in FIG. 1A.

The protective layer 5 preferably protrudes more than the battery element 100 in sectional view. The part that the protective layer 5 protrudes more than the battery element 100 in sectional view means that the protective layer 5 (particularly an end thereof), as illustrated in FIGS. 1A and 2 to 6, protrudes to an outside m2 in the in-plane direction M perpendicular to the stacking direction L in sectional view more than the battery element 100 (particularly its end). Such a protrusion of the protective layer 5 is usually formed across the entire peripheral end of the protective layer 5 in the plan view, as illustrated in FIG. 1B. In the protective layer 5, particularly a portion protruding from the battery element 100 is referred to as a "protruding portion 51". Specifically, the protective layer 5 has a protruding portion 51 on both the upper and lower surfaces, that is, the protective layer 5 covering the upper surface of the battery element 100 has an upper surface protruding portion, and the protective layer 5 covering the lower surface of the battery element 100 has a lower surface protruding portion. FIG. 1B is a schematic plan view illustrating the solid-state battery according to the present invention illustrated in FIG. 1A. In FIG. 1B, the battery element 100 illustrates an overlapping portion of each layer constituting the battery element 100 in the plan view, and thus, for example, the electrical connection portions 11a and 21a of the positive electrode current collecting layer 11 and the negative electrode current collecting layer 21, respectively, are omitted. The in-plane direction M perpendicular to the stacking direction L means any direction in the plane perpendicular to the stacking direction L with respect to the solid-state battery. The outside m2 of such an in-plane direction M is the outside m2 when viewed from the solid-state battery in the in-plane direction M, and an opposite direction of the outer direction m2 is an inner direction m1. Since the protective layer 5 protrudes more than the battery element 100 in sectional view, if a volume expansion occurs in the battery element 100 outward in the in-plane direction M perpendicular to the stacking direction L of each layer constituting the battery constitutional unit 100, the volume expansion can be contained between the protruding portions 51 of the protective layer 5 on the upper and lower surfaces of the battery element 100. Therefore, contact and short circuit with the adjacent solid-state battery in the direction M can be sufficiently prevented.

A protruding length of the protective layer 5 (that is, a protruding length of the protruding portion 51) n (including n1 and n2) (mm) is not particularly limited as long as the volume expansion can be contained and may be, for example, $0.00001 \times N$ to $0.1 \times N$, particularly $0.0001 \times N$ to $0.01 \times N$ with respect to the total length N (including N1 and N2) (mm) in the protruding direction.

(Side Surface Reinforcing Portion)

From the viewpoint of further suppressing deterioration of the battery performance due to adsorption, absorption, permeation, and the like of moisture and gas (carbon dioxide), the solid-state battery according to the present invention preferably has the side surface reinforcing portion 6 on the side surface of the battery element 100, that is, the side surface of the stack constituted of the layers constituting the battery element 100, as illustrated in FIGS. 1A and 2 to 6. For example, when the protective layer 5 protrudes more than the battery element 100 in sectional view as described above, the solid-state batteries 200A to 200F according to the present invention preferably have, as illustrated in FIGS. 1A and 2 to 6, the side surface reinforcing portion 6 that covers the side surface of the battery element 100 between the protruding portion 51 (upper surface protruding portion) of the protective layer 5 covering the upper surface of the battery element 100 and the protruding portion 51 (lower surface protruding portion) of the protective layer 5 covering the lower surface of the battery element 100. The side surface reinforcing portion 6 covers the side surface of the battery element 100 from the upper surface (that is, the height of the upper surface) to the lower surface (that is, the height of the lower surface) of the battery element. Note that in a paper surface of the schematic sectional view (for example, FIGS. 1A and 2 to 6) of the solid-state battery, the side surface of the battery element 100 includes not only a right side surface and a left side surface of the battery element but also a front side surface and a back side surface with respect to the paper surface.

The side surface reinforcing portion 6 may be constituted of a sintered body containing solid electrolyte particles, may be constituted of a sintered body containing insulating substance particles other than resin, or may be a sintered body containing mixed particles thereof. Because the side surface reinforcing portion 6 is constituted of such a sintered body, the side surface reinforcing portion 6 has even more excellent moisture resistance, environmental resistance, and durability. Specifically, the side surface reinforcing portion 6 can be a side surface reinforcing portion 6 that is relatively difficult to adsorb, absorb, and allow permeation of moisture and gas (carbon dioxide), and has high joint strength with the battery element. Consequently, in the solid-state battery according to the present invention, the side surface reinforcing portion 6 is relatively less likely to crack and fall off based on expansion due to adsorption and absorption of water and gas (carbon dioxide), and is less likely to fall off due to vibration, impact, and the like. Further, the side surface reinforcing portion 6 is relatively difficult to allow permeation of moisture and gas (carbon dioxide). Consequently, the solid-state battery according to the present invention can further suppress deterioration of the battery performance. From the viewpoint of further suppressing deterioration of the battery performance of such a solid-state battery, it is preferable that the side surface reinforcing portion 6 be constituted of a sintered body containing insulating substance particles other than resin.

The insulating substance other than resin that can form the side surface reinforcing portion 6 may be independently selected from materials similar to the insulating substance other than resin that can be contained in the protective layer.

The thickness of the side surface reinforcing portion 6 is not particularly limited, and when the protective layer 5 has the protruding portion 51, it is equal to or less than the protruding length of the protruding portion 51. The thickness of the side surface reinforcing portion 6 is preferably, for example, 5 μm to 300 μm, particularly 5 μm to 100 μm, from the viewpoint of further suppressing deterioration of the battery performance due to adsorption, absorption, permeation, and the like of moisture and gas (carbon dioxide).

Note that the thickness of the side surface reinforcing portion 6 is a thickness in the in-plane direction M perpendicular to the stacking direction L.

It is preferable that the side surface reinforcing portion 6 be integrally sintered as sintered bodies together with the side surface of the battery element 100. The part that the side surface reinforcing portion 6 is integrally sintered as sintered bodies together with the side surface of the battery element 100 means that the side surface reinforcing portion 6 is joined by sintering to the side surface of the battery element 100. Specifically, the side surface reinforcing portion 6 and the side surface of the battery element 100 are both sintered bodies, but are integrally sintered. For example, it is preferable that the side surface reinforcing portion 6 and the battery element 100 have an integrally sintered structure. Note that the side surface reinforcing portion 6 and the side surface of the battery element 100 covered with the side surface reinforcing portion 6 do not have to be all strictly integrated, and a part thereof may be not integrated. The side surface reinforcing portion 6 and the side surface of the battery element 100 covered with the side surface reinforcing portion 6 are only required to be integrated as a whole.

Figure 7:
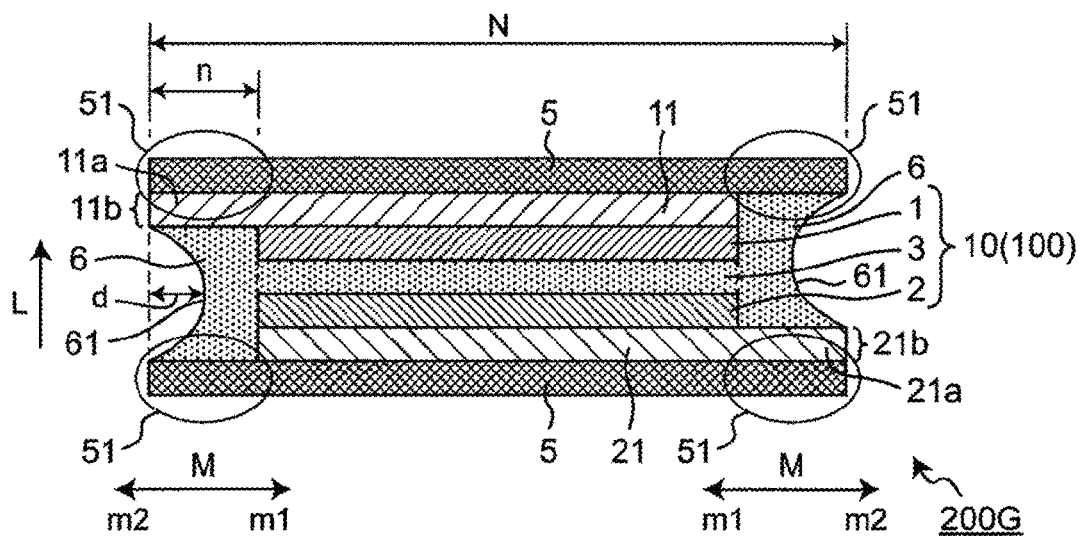
FIG. 7 is a schematic sectional view illustrating another example of the solid-state battery according to the present invention having the single battery structure in the battery element.
Figure 8:
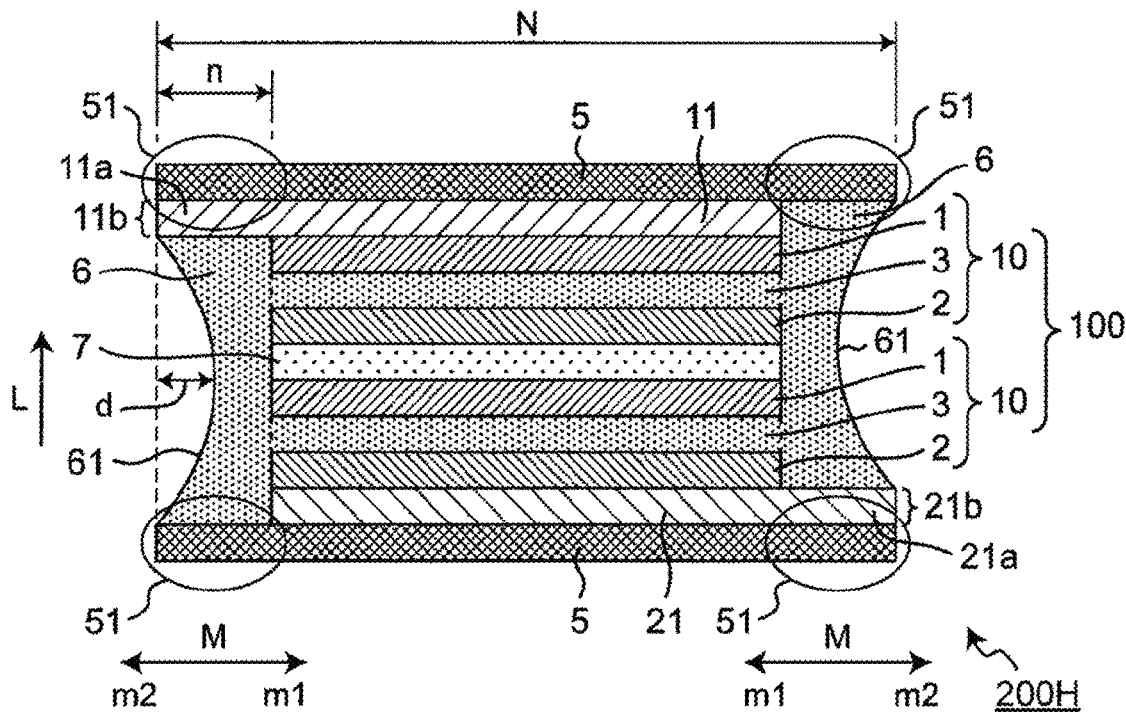
FIG. 8 is a schematic sectional view illustrating another example of the solid-state battery according to the present invention having the series multiple battery structure in the battery element.
Figure 9:
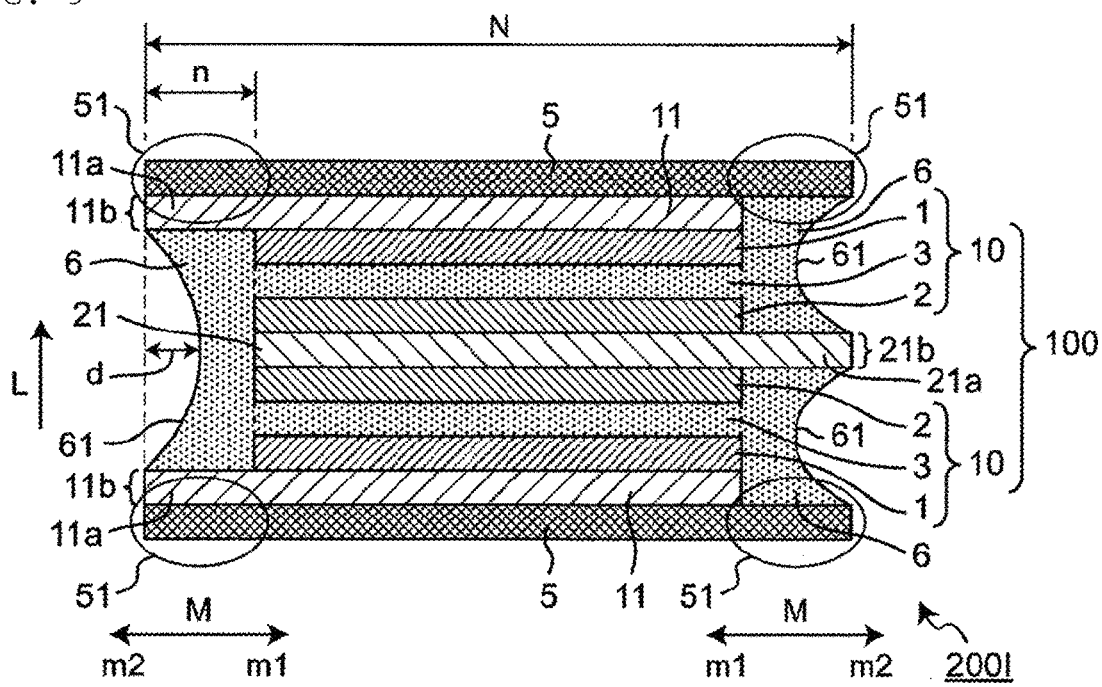
FIG. 9 is a schematic sectional view illustrating another example of the solid-state battery according to the present invention having the parallel multiple battery structure in the battery element.
Figure 10:
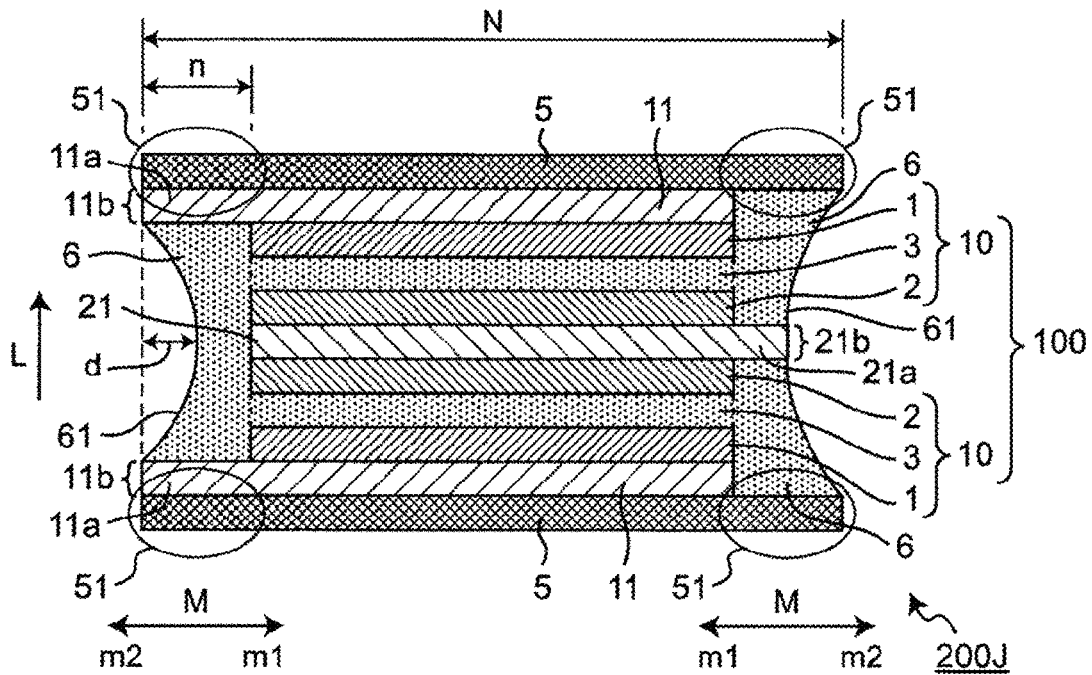
FIG. 10 is a schematic sectional view illustrating another example of the solid-state battery according to the present invention having the parallel multiple battery structure in the battery element.
Figure 11:
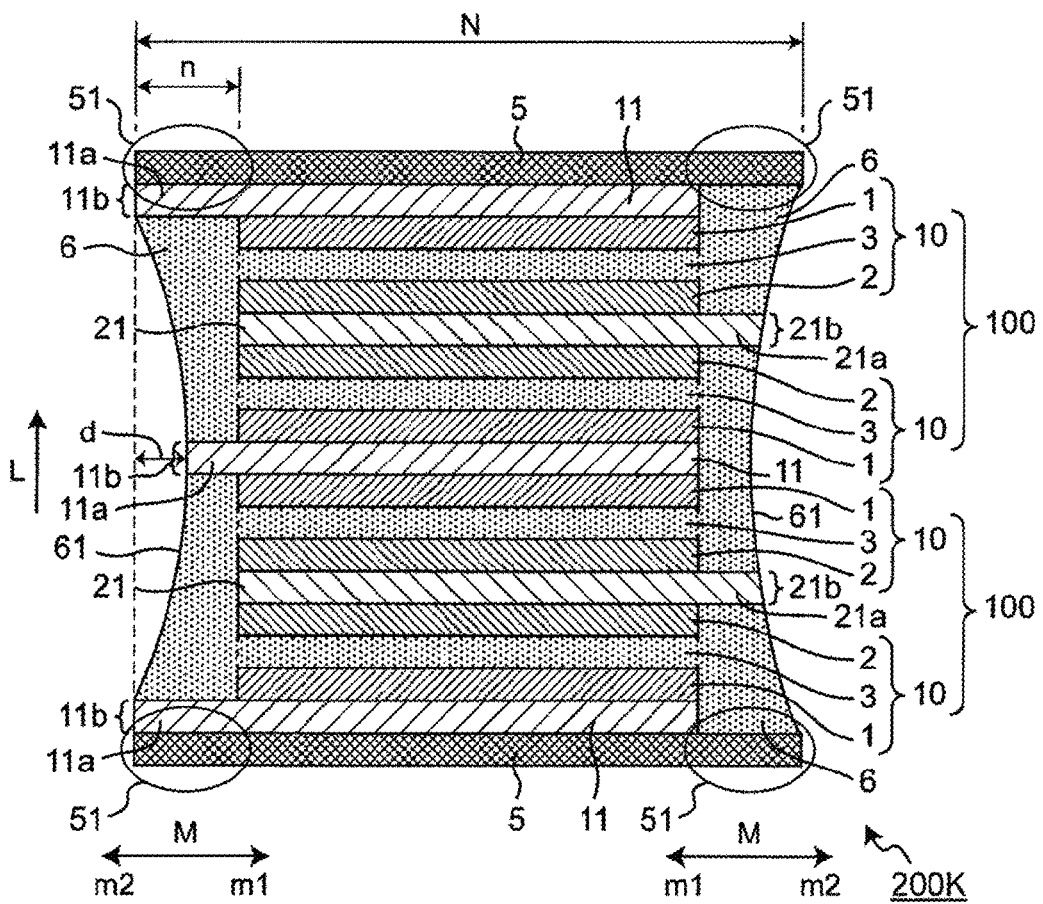
FIG. 11 is a schematic sectional view illustrating another example of the solid-state battery according to the present invention having the parallel multiple battery structure in the battery element.

In sectional view, an outer peripheral surface 61 of the side surface reinforcing portion 6 is preferably curved inward m1 in the in-plane direction M perpendicular to the stacking direction L. Being curved means being continuously bent or gradually depressed. The part that the outer peripheral surface 61 of the side surface reinforcing portion 6 is curved inward m1 in the in-plane direction M perpendicular to the stacking direction L in sectional view means that, as illustrated in FIGS. 7 to 11, the outer peripheral surface 61 of the side surface reinforcing portion 6 gradually approaches the side surface of the battery element 100 as it advances upward in the stacking direction L, and then gradually moves away from the side surface. In other words, a depth of the curve gradually decreases and then gradually increases as it advances upward in the stacking direction L. FIG. 7 is a schematic sectional view illustrating another example of the solid-state battery according to the present invention having the single battery structure in the battery element. The solid-state battery of FIG. 7 is similar to the solid-state battery of FIG. 1A except that the side surface reinforcing portion 6 has a curve on the outer peripheral surface 61. FIG. 8 is a schematic sectional view illustrating another example of the solid-state battery according to the present invention having the series multiple battery structure in the battery element. The solid-state battery of FIG. 8 is similar to the solid-state battery of FIG. 2 except that the side surface reinforcing portion 6 has a curve on the outer peripheral surface 61. FIGS. 9 and 10 are schematic sectional views illustrating another example of the solid-state battery according to the present invention having a parallel multiple battery structure in the battery element. The solid-state batteries of FIGS. 9 and 10 are similar to the solid-state batteries of FIG. 3 except that the side surface reinforcing portion 6 has a curve on the outer peripheral surface 61. FIG. 11 is a schematic sectional view illustrating another example of the solid-state battery according to the present invention having the parallel multiple battery structure in the battery element. Note that the solid-state battery of FIG. 11 has a parallel multiple battery structure including four battery constitutional units 10.

The curve of the outer peripheral surface 61 of the side surface reinforcing portion 6 may be formed over the entire circumference of the side surface reinforcing portion 6 in the plan view.

The depth of the curve is not particularly limited as long as the shape of the solid-state battery can be maintained. A maximum depth d of the curve is usually 0.01×n to 0.8×n, particularly 0.1×n to 0.5×n, with respect to the protrusion length n (mm) of the protruding portion 51. The maximum depth d of the curve may be, for example, 50 μm or less, particularly 1 μm to 50 μm.

The number of curves per one side in the in-plane direction M perpendicular to the stacking direction L in sectional view may be one or more (for example, one to three) depending on a volume change (for example, a volume change due to sintering) of each layer constituting the battery element 100. One side means one side in a left-right direction in sectional view. For example, as in the solid-state batteries illustrated in FIGS. 7, 8, 10, and 11, the number of curves per one side in the left-right direction in the sectional view may be one. Further, for example, as in the solid-state battery illustrated in FIG. 9, the number of curves on the left side in the sectional view may be one, and the number of curves on the right side may be two. The reason why the number of curves on the right side of the solid-state battery illustrated in FIG. 9 is two is that, for example, the degree of volume shrinkage of the negative electrode current collecting layer 21 at the time of sintering is smaller than that of the other layers.

The side surface reinforcing portion 6 preferably has porosity within a range similar to that of the porosity of the protective layer 5.

The side surface reinforcing portion 6 preferably has air permeability in the thickness direction within a range similar to that of the air permeability in the thickness direction of the protective layer 5.

In the present invention, at least a part of the electrical connection portions 11a, 21a, 1a, and 2a is not covered with the protective layer 5 or the side surface reinforcing portion 6, and an exposed portion is provided in the electrical connection portions.

For example, as illustrated in FIGS. 1A, 2 to 3, and 7 to 11, when the positive electrode layer 1 and the negative electrode layer 2 have the positive electrode current collecting layer 11 and the negative electrode current collecting layer 21, respectively, at least a part of the electrical connection portions 11a and 21a of the positive electrode current collecting layer 11 and the negative electrode current collecting layer 21, respectively, is not covered with the protective layer 5 or the side surface reinforcing portion 6, and the exposed portions 11b and 21b are provided in the electrical connection portions. The exposed portions 11b and 21b mean portions where the positive electrode current collecting layer 11 and the negative electrode current collecting layer 21 are exposed, respectively. At this time, from the viewpoint of suppressing deterioration of the battery performance for a longer period of time, it is preferable that the positive electrode layer 1, the positive electrode current collecting layer 11, the negative electrode layer 2, the negative electrode current collecting layer 21, and the solid electrolyte layer 3 constituting the battery element 100 are not exposed to the outside of the protective layer 5 or the side surface reinforcing portion 6 except the exposed portions 11b and 21b. In other words, it is preferable that the entire surface of the outer surface of the battery element 100 except the exposed portions 11b and 21b be covered with the protective layer 5 or the side surface reinforcing portion 6. In FIGS. 1A, 2, 3, and 7 to 11, all the exposed portions 11b and 21b are formed on the side surfaces of the battery element 100 (or solid-state battery), but are not limited thereto. For example, the exposed portions 11b and 21b of the electrical connection portions 11a and 21a in the positive electrode current collecting layer 11 and the negative electrode current collecting layer 21 as the outermost layers, respectively, may be provided on the upper surface or the lower surface of the battery element 100 (or the solid-state battery).

Further, for example, as illustrated in FIGS. 4 to 6, when the positive electrode layer 1 and the negative electrode layer 2 do not have the positive electrode current collecting layer and the negative electrode current collecting layer, respectively, at least a part of the electrical connection portions 1a and 2a of the positive electrode layer 1 and the negative electrode layer 2 is not covered with the protective layer 5 or the side surface reinforcing portion 6, and the exposed portions 1b and 2b are provided in these electrical connection portions. The exposed portions 1b and 2b mean portions where the positive electrode layer 1 and the negative electrode layer 2 are exposed, respectively. At this time, from the viewpoint of suppressing deterioration of the battery performance for a longer period of time, it is preferable that the positive electrode layer 1, the negative electrode layer 2, and the solid electrolyte layer 3 constituting the battery element 100 are not exposed to the outside of the protective layer 5 or the side surface reinforcing portion 6 except the exposed portions 1b and 2b. In other words, it is preferable that the entire surface of the outer surface of the battery element 100 except the exposed portions 1b and 2b be covered with the protective layer 5 or the side surface reinforcing portion 6. In FIGS. 4 to 6, all the exposed portions 1b and 2b are formed on the side surfaces of the battery element 100 (or solid-state battery), but are not limited thereto. For example, the exposed portions 1b and 2b of the electrical connection portions 1a and 2a in the positive electrode layer 1 and the negative electrode layer 2 as the outermost layers, respectively, may be provided on the upper surface or the lower surface of the battery element 100 (or the solid-state battery).

(Connection Layer)

When the solid-state battery according to the present invention has the series multiple battery structure in the battery element 100 as illustrated in FIGS. 2 and 5, the solid-state batteries 200B, 200E may have the connection layer 7 between the battery constitutional units 10. The connection layer 7 achieves the connection between the positive electrode layer 1 and the negative electrode layer 2 and prevents an electrical short circuit between them.

The connection layer 7 may be constituted of a sintered body containing insulating substance particles other than resin.

The insulating substance other than resin that can form the connection layer 7 may be independently selected from materials similar to the insulating substance other than resin that can be contained in the protective layer.

The thickness of the connection layer 7 is not particularly limited, and is preferably 1 μm to 10 μm, particularly 1 μm to 3 μm, for example.

It is preferable that the connection layer 7 be integrally sintered as sintered bodies together with the adjacent layers (for example, the positive electrode layer 1 and/or the negative electrode layer 2). The part that the connection layer 7 is integrally sintered as sintered bodies together with the adjacent layer means that the connection layer 7 is joined by sintering to the adjacent layer. Specifically, the connection layer 7 and the adjacent layers are both sintered bodies, but are integrally sintered. For example, it is preferable that the connection layer 7 have a structure integrally sintered with all other layers constituting the battery element 100.

Note that the connection layer 7 and the adjacent layers do not have to be all strictly integrated, and a part thereof may be not integrated. The connection layer 7 and the adjacent layers are only required to be integrated as a whole.

[Solid-State Battery Group]

A solid-state battery group according to the present invention includes two or more solid-state batteries. It is preferable that the solid-state battery group according to the present invention include one or more solid-state batteries according to the present invention described above, and include only two or more solid-state batteries according to the present invention from the viewpoint of further suppressing deterioration of the battery performance in a longer period of time. That is, it is preferable that the solid-state battery group according to the present invention be constituted of only two or more solid-state batteries according to the present invention.

When the solid-state battery group according to the present invention is constituted of only two or more solid-state batteries according to the present invention, the two or more solid-state batteries according to the present invention may be independently selected from the group constituted of the above-described solid-state batteries according to the present invention. Specifically, in the two or more solid-state batteries according to the present invention, for example, at least one factor selected from the following group may be different from each other, or all of these factors may be the same:

a group constituted of the number of battery constitutional units 10 included in the battery element 100 of the solid-state battery, and types and dimensions of constituent materials in the positive electrode layer 1 (and the positive electrode current collecting layer 11), the negative electrode layer 2 (and the negative electrode current collecting layer 21), the solid electrolyte layer 3, the protective layer 5, and the side surface reinforcing portion 6 (and the connection layer 7).

Note that it is preferable that all the solid-state batteries constituting the solid-state battery group according to the present invention have the same (or common) battery constitutional unit 10 from the viewpoint of further suppressing deterioration of the battery performance in a longer period of time on the basis of having a uniform battery reaction. The part that all the solid-state batteries have the same (or common) battery constitutional unit 10 means that types and dimensions of constituent materials of the positive electrode layer 1 (and the positive electrode current collecting layer 11), the negative electrode layer 2 (and the negative electrode current collecting layer 21), and the solid electrolyte layer in the all solid-state batteries are the same.

It is preferable that in the solid-state battery group according to the present invention, from the viewpoint of easily meeting specifications (for example, battery capacity) of the solid-state battery group demanded by the user, and/or further suppressing deterioration of the battery performance in a longer period of time, all of the above-described factors only include two or more same solid-state batteries according to the present invention, or at least one factor selected from the following group only include two or more solid-state batteries according to the present invention different from each other.

A group including the number of battery constitutional units 10 included in the battery element 100 of the solid-state battery and types of constituent materials in the protective layer.

By selecting two or more solid-state batteries having different numbers of battery constitutional units 10 included in the battery element 100, it is possible to more easily meet the battery capacity of the solid-state battery group demanded by the user.

By selecting two or more solid-state batteries using constituent materials with different specific gravities as the constituent materials of the protective layer, the centers of gravity of the batteries can be controlled to suppress falling off from the substrate or the like, thereby suppressing deterioration of the battery performance for a much longer period of time.

Such preferred embodiments of the solid-state battery group according to the present invention will be exemplified below.

Figure 12:
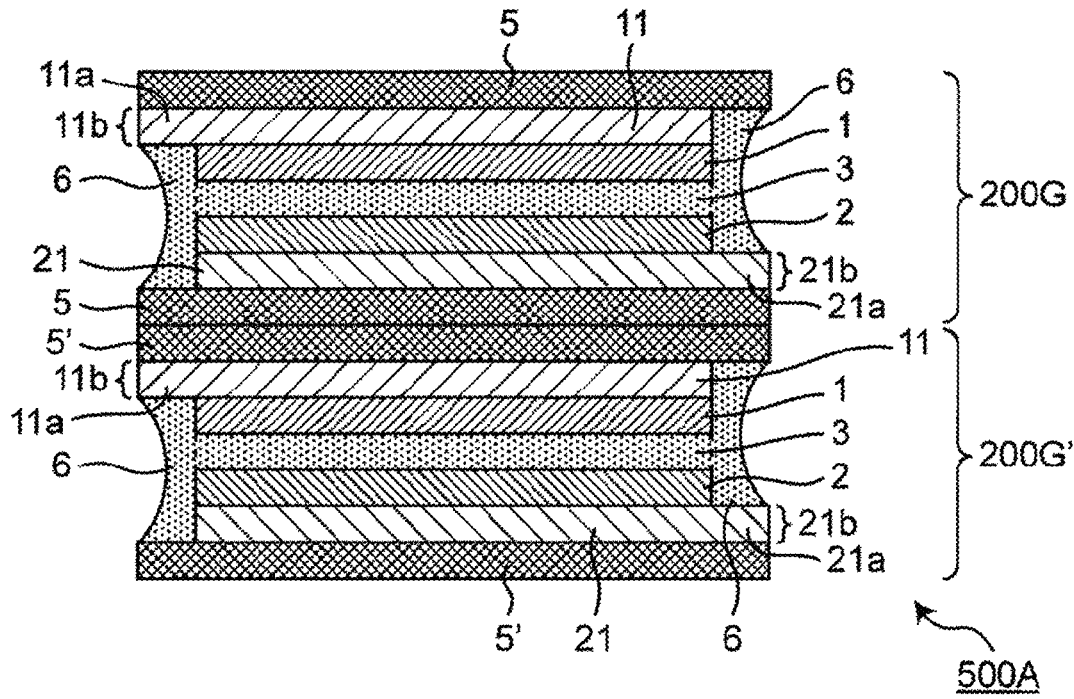
FIG. 12 illustrates a schematic sectional view of a solid-state battery group according to a first embodiment of the present invention.

For example, a solid-state battery group 500A of FIG. 12 includes only two solid-state batteries according to the present invention, an upper solid-state battery corresponds to a solid-state battery 200G of FIG. 7, and a lower solid-state battery corresponds to a solid-state battery 200G' having two protective layers 5' that have different constituent materials from those of the protective layer 5 of the upper solid-state battery 200G. FIG. 12 illustrates a schematic sectional view of a solid-state battery group according to a first embodiment of the present invention. Note that the protective layer 5' indicates that constituent materials actually used are different from those of the protective layer 5, and are included in the protective layer 5 described above. In FIG. 12, the two solid-state batteries have a single battery structure and are connected so as to form a parallel connection. Thus, capacity of the solid-state battery group 500A can be increased without changing the battery voltage as compared to one solid-state battery having the single battery structure.

The number of solid-state batteries included in the solid-state battery group according to the present invention is not particularly limited, and may be, for example, two or more, particularly two to 100, preferably two to 50. The connection of two or more solid-state batteries constituting the solid-state battery group is based on parallel connection in FIG. 12, but may be based on series connection.

In the solid-state battery group according to the present invention, it is preferable that two adjacent solid-state batteries be integrally sintered as sintered bodies together with the protective layer interposed therebetween, and it is more preferable that all two adjacent solid-state batteries be integrally sintered as sintered bodies together with the protective layer interposed therebetween, among the two or more (preferably all) solid-state batteries constituting the solid-state battery group. Thus, even when a strong vibration or impact is applied to the solid-state battery group, it is difficult for the solid-state batteries to separate from each other, and it is difficult for the battery performance to deteriorate due to separation. Furthermore, deterioration of the battery performance can be further suppressed as compared to a case where the protective layer is not interposed between the two adjacent solid-state batteries. Details of this mechanism are unknown, but it is conceivably based on the following mechanism. When no protective layer is interposed between two adjacent solid-state batteries, stress caused by volume expansion of the positive electrode layer and the negative electrode layer due to battery reaction (charge and discharge reaction) is easily transmitted between two adjacent solid-state batteries even if it is local. Such stress is dispersed by the interposition of the protective layer and is difficult to be transmitted between the two adjacent solid-state batteries, and thus deterioration of the battery performance can be further suppressed.

The part that two adjacent solid-state batteries are integrally sintered as sintered bodies together with the protective layer interposed therebetween means that the two adjacent solid-state batteries are joined by sintering with the protective layer interposed therebetween. Specifically, the two adjacent solid-state batteries are both sintered bodies, but are integrally sintered. More specifically, while the protective layer and the battery element are integrally sintered as sintered bodies together in each solid-state battery, the protective layer of one solid-state battery and the protective layer of the other solid-state battery are integrally sintered (joined) as sintered bodies together. Note that it is not always needed to strictly integrate all of between the protective layer and the battery element in each solid-state battery and between the protective layer of one solid-state battery and the protective layer of the other solid-state battery, and a part thereof may be not integrated. The protective layer and the battery element in each solid-state battery are only required to be integrated as a whole. The protective layer of one solid-state battery and the protective layer of the other solid-state battery are only required to be integrated as a whole.

In the solid-state battery group according to the present invention, all the solid-state batteries constituting the solid-state battery group may be stacked along the stacking direction L of each layer constituting each battery constitutional unit as illustrated in FIG. 12. At least a part of the solid-state batteries constituting the solid-state battery group according to the present invention may be arranged in the direction M perpendicular to the stacking direction L. Joining of sintered bodies together with the protective layer interposed therebetween can be achieved both between the two solid-state batteries adjacent to each other in the stacking direction L and between the two solid-state batteries adjacent to each other in the direction M perpendicular to the stacking direction L.

In the solid-state battery group according to the present invention illustrated in FIG. 12, two protective layers (that is, a protective layer of one solid-state battery and a protective layer of the other solid-state battery) are interposed between two adjacent solid-state batteries, but it is also possible to unify the two protective layers and share one protective layer by the two solid-state batteries. For example, as illustrated in FIGS. 13 to 21, only one protective layer may be interposed between the two adjacent solid-state batteries. In the solid-state battery group according to the present invention, while two layers of protective layers are interposed between two specific adjacent solid-state batteries, only one protective layer may also be interposed between two other adjacent solid-state batteries. In the solid-state battery group according to the present invention, as illustrated in FIGS. 13 to 21, energy density of the solid-state battery group can be further improved by unifying the two protective layers between the two adjacent solid-state batteries. Moreover, as described above, not only separation between the solid-state batteries is suppressed between the two adjacent solid-state batteries, but also transmission due to dispersion of stress caused by volume expansion of the positive electrode layer and the negative electrode layer is suppressed, and thus deterioration of battery performance can be further suppressed. When two protective layers are interposed between the two adjacent solid-state batteries in the solid-state battery group according to the present invention, the form of the interposed protective layers is referred to as "two-layer form". On the other hand, when only one protective layer is interposed between the two adjacent solid-state batteries in the solid-state battery group according to the present invention, the form of the interposed protective layer is referred to as "single form".

Hereinafter, preferred embodiments of the solid-state battery group according to the present invention will be described.

Figure 13:
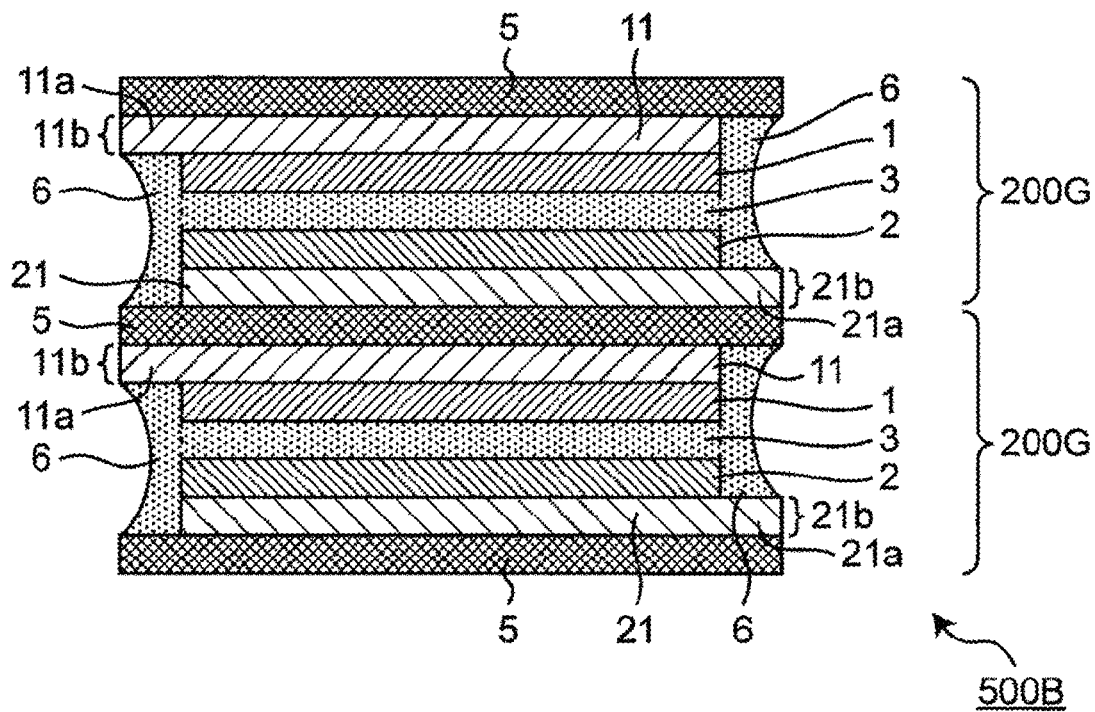
FIG. 13 illustrates a schematic sectional view of a solid-state battery group according to a second embodiment of the present invention.

For example, although a solid-state battery group 500B of FIG. 13 includes only two solid-state batteries according to the present invention, and upper and lower solid-state batteries both correspond to the solid-state battery 200G of FIG. 7, the protective layers are unified between the two adjacent solid-state batteries. FIG. 13 illustrates a schematic sectional view of a solid-state battery group according to a second embodiment of the present invention. In FIG. 13, the two solid-state batteries have a single battery structure and are connected so as to form a parallel connection. Thus, capacity of the solid-state battery group 500B can be increased without changing the battery voltage as compared to one solid-state battery having the single battery structure.

Figure 14:
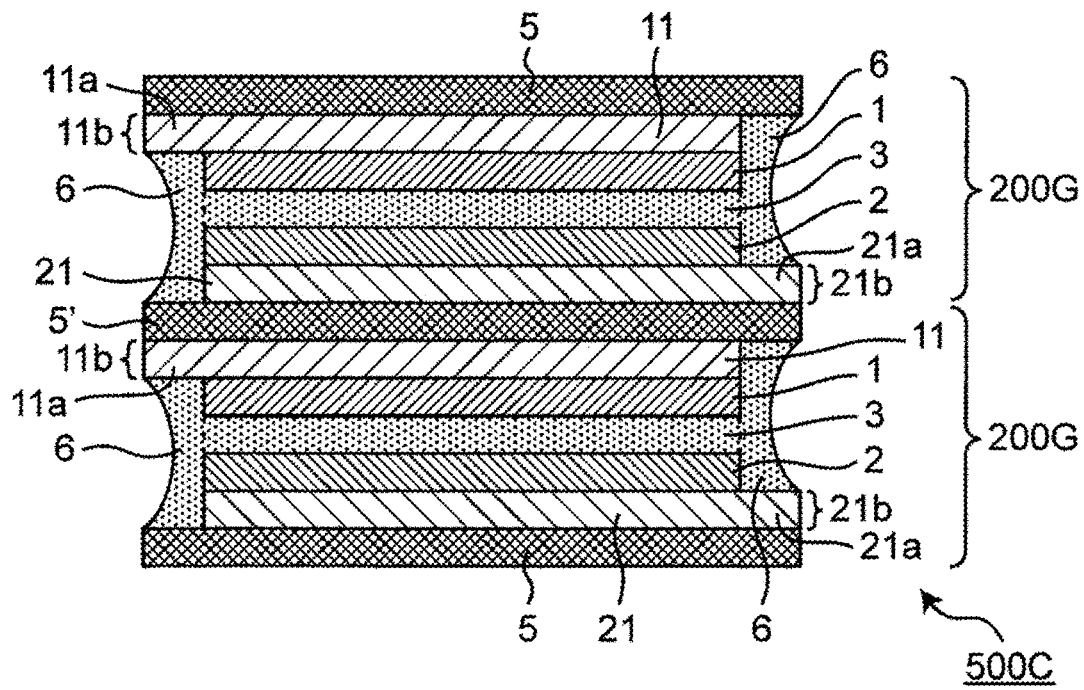
FIG. 14 illustrates a schematic sectional view of a solid-state battery group according to a third embodiment of the present invention.

Further, for example, although a solid-state battery group 500C of FIG. 14 includes only two solid-state batteries according to the present invention, and upper and lower solid-state batteries both correspond to the solid-state battery 200G of FIG. 7, the protective layers are unified between the two adjacent solid-state batteries, and the protective layer between the two solid-state batteries is a protective layer 5' that has a different constituent material from the protective layer 5 of the upper and lower solid-state batteries 200G. FIG. 14 illustrates a schematic sectional view of a solid-state battery group according to a third embodiment of the present invention. In FIG. 14, the two solid-state batteries have a single battery structure and are connected so as to form a parallel connection. Thus, capacity of the solid-state battery group 500C can be increased without changing the battery voltage as compared to one solid-state battery having the single battery structure.

Figure 15:
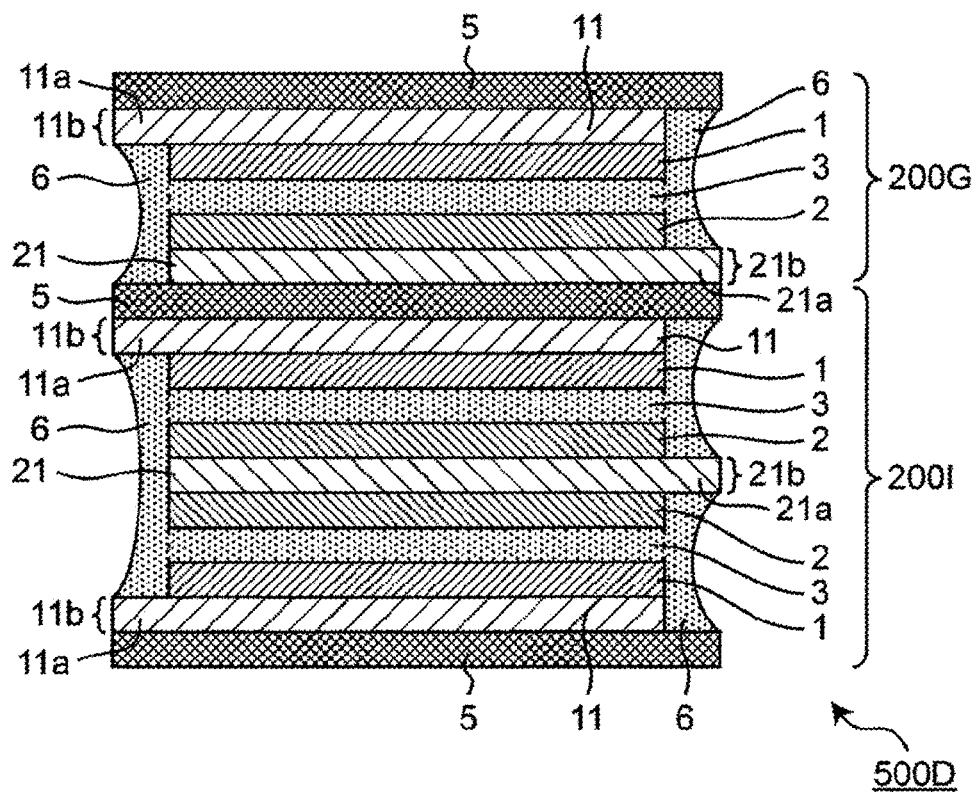
FIG. 15 illustrates a schematic sectional view of a solid-state battery group according to a fourth embodiment of the present invention.

Further, for example, although a solid-state battery group 500D of FIG. 15 includes only two solid-state batteries according to the present invention, an upper solid-state battery corresponds to the solid-state battery 200G of FIG. 7, and a lower solid-state battery corresponds to a solid-state battery 200I of FIG. 9, the protective layers are unified between the two adjacent solid-state batteries. FIG. 15 illustrates a schematic sectional view of a solid-state battery group according to a fourth embodiment of the present invention. In FIG. 15, two solid-state batteries are a solid-state battery having a single battery structure and a solid-state battery having a parallel multiple battery structure, and are connected so as to form a parallel connection. Thus, capacity of the solid-state battery group 500D can be increased without changing the battery voltage as compared to one of the above-described solid-state batteries.

Figure 16:
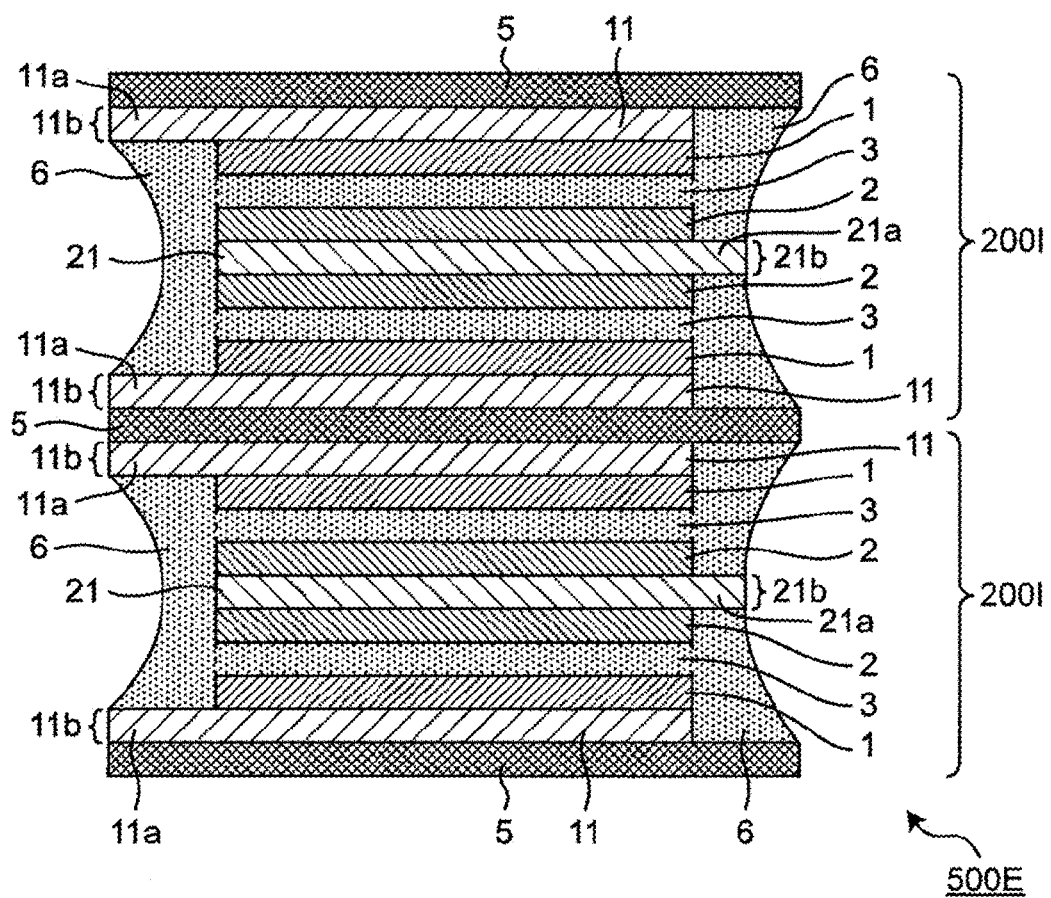
FIG. 16 illustrates a schematic sectional view of a solid-state battery group according to a fifth embodiment of the present invention.

Further, for example, although a solid-state battery group 500E of FIG. 16 includes only two solid-state batteries according to the present invention, and upper and lower solid-state batteries both correspond to the solid-state battery 200I of FIG. 9, the protective layers are unified between the two adjacent solid-state batteries. FIG. 16 illustrates a schematic sectional view of a solid-state battery group according to a fifth embodiment of the present invention. In FIG. 16, the two solid-state batteries are solid-state batteries having a parallel multiple battery structure and are connected so as to form a parallel connection. Thus, capacity of the solid-state battery group 500E can be increased without changing the battery voltage as compared to one solid-state battery having the parallel multiple battery structure.

Figure 17:
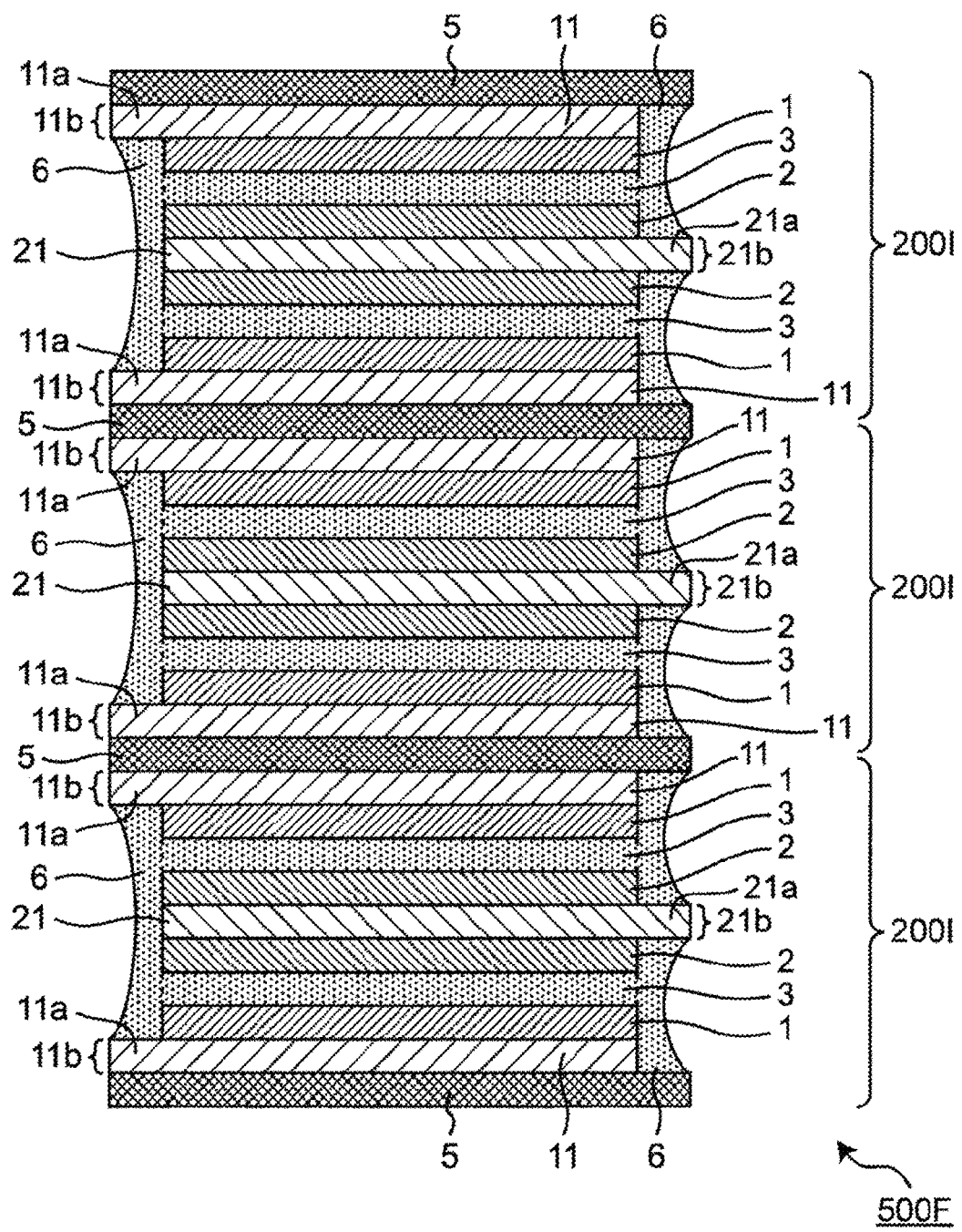
FIG. 17 illustrates a schematic sectional view of a solid-state battery group according to a sixth embodiment of the present invention.

Further, for example, although a solid-state battery group 500F of FIG. 17 includes only three solid-state batteries according to the present invention, and the three solid-state batteries all correspond to the solid-state battery 200I of FIG. 9, the protective layers are unified between all the two adjacent solid-state batteries. FIG. 17 illustrates a schematic sectional view of a solid-state battery group according to a sixth embodiment of the present invention. In FIG. 17, the three solid-state batteries are solid-state batteries having a parallel multiple battery structure and are connected so as to form a parallel connection. Thus, capacity of the solid-state battery group 500F can be increased without changing the battery voltage as compared to one solid-state battery having the parallel multiple battery structure or one solid-state battery group 500E of FIG. 16.

Figure 18:
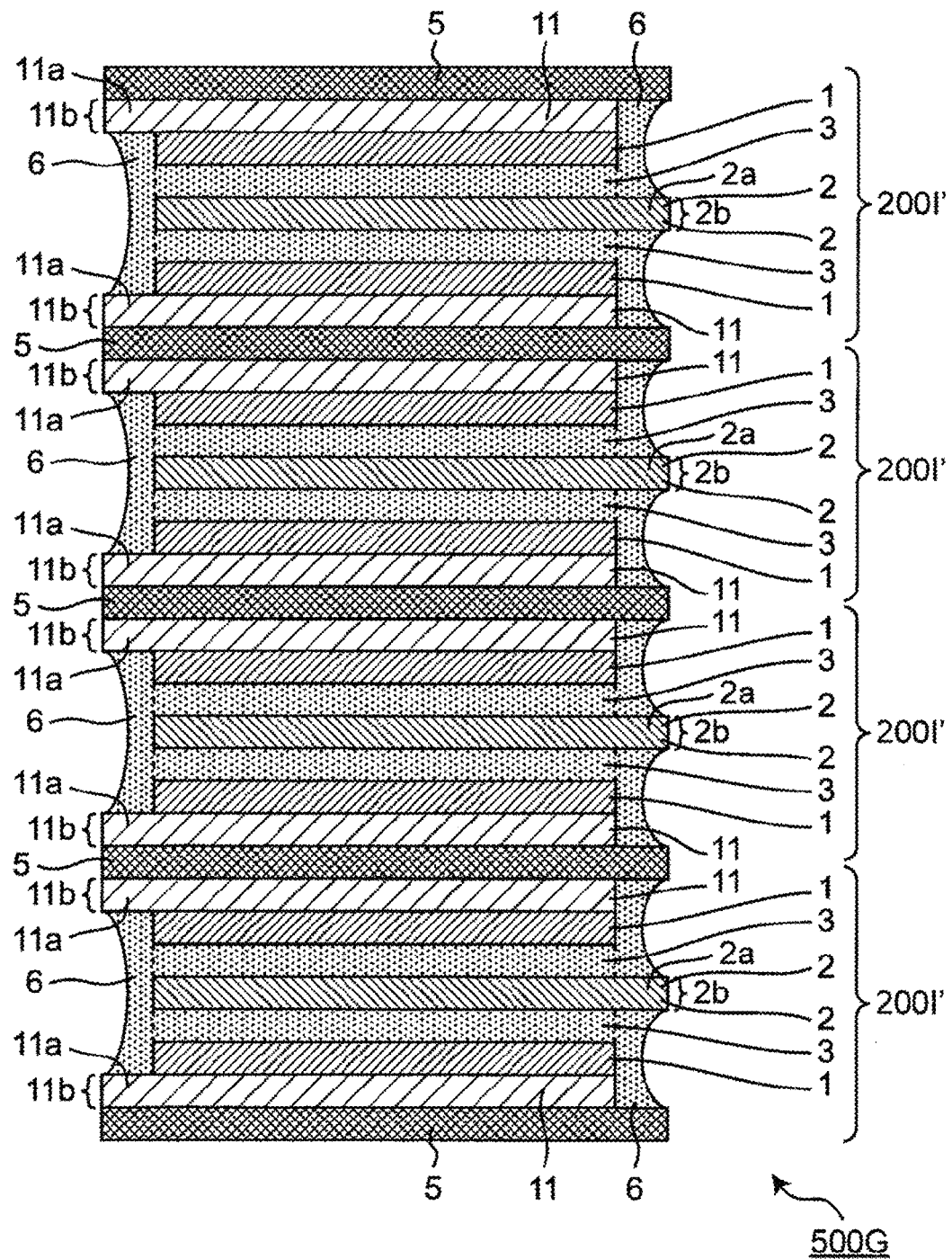
FIG. 18 illustrates a schematic sectional view of a solid-state battery group according to a seventh embodiment of the present invention.

Further, for example, although a solid-state battery group 500G of FIG. 18 includes only four solid-state batteries according to the present invention, and the four solid-state batteries all correspond to a solid-state battery 200I' described later, the protective layers are unified between all the two adjacent solid-state batteries. The solid-state battery 200I' is similar to the solid-state battery 200I of FIG. 9 except that the negative electrode layer 2 does not have the negative electrode current collecting layer 21 and the negative electrode layer 2 has the electrical connection portion 2a and the exposed portion 2b. FIG. 18 illustrates a schematic sectional view of a solid-state battery group according to a seventh embodiment of the present invention. Note that in each solid-state battery 200I' in FIG. 18, the negative electrode layer 2 is illustrated as one layer for convenience. In FIG. 18, the four solid-state batteries are solid-state batteries having a parallel multiple battery structure and are connected so as to form a parallel connection. Thus, capacity of the solid-state battery group 500G can be increased without changing the battery voltage as compared to one solid-state battery having the parallel multiple battery structure.

Figure 19:
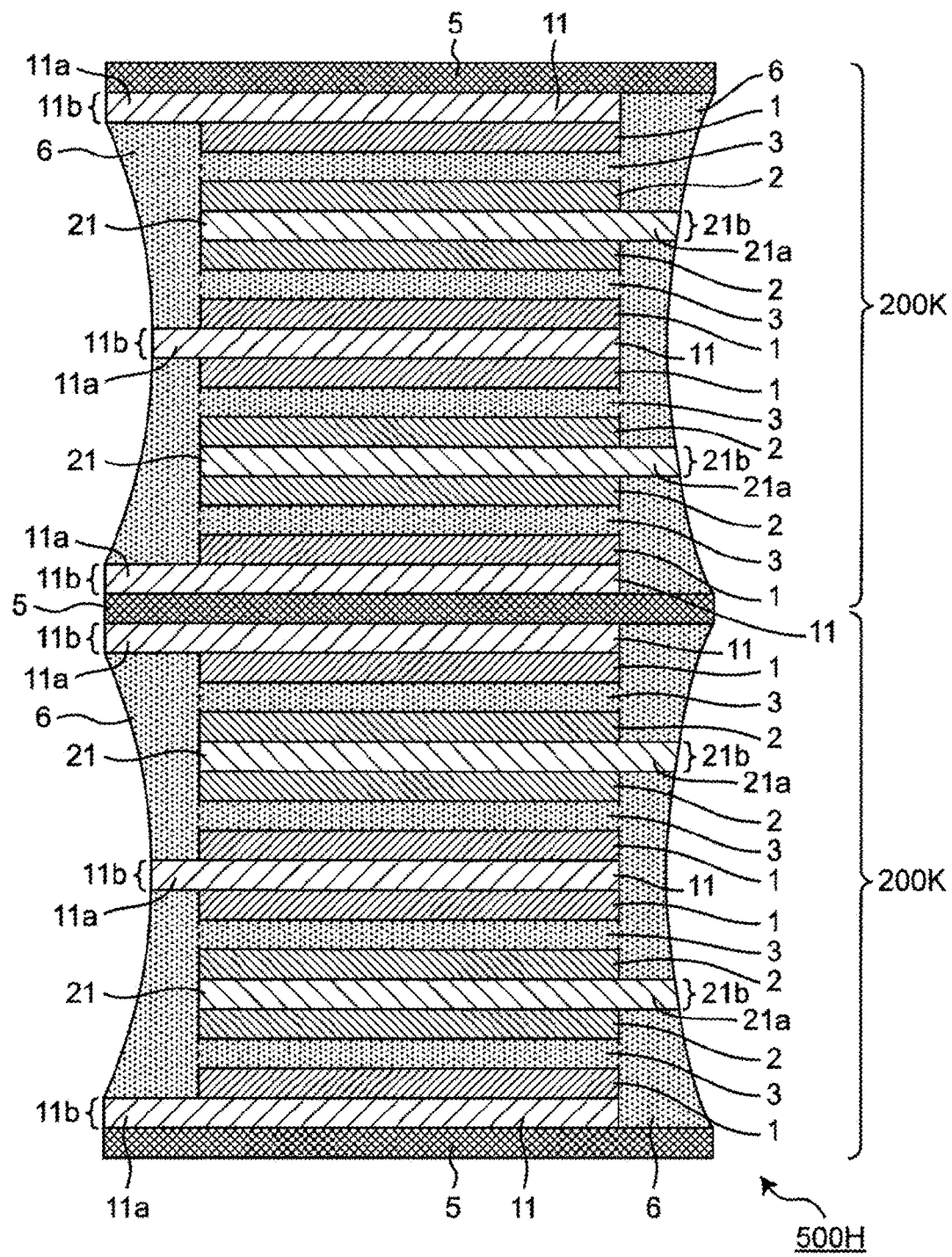
FIG. 19 illustrates a schematic sectional view of a solid-state battery group according to an eighth embodiment of the present invention.

Further, for example, although a solid-state battery group 500H of FIG. 19 includes only two solid-state batteries according to the present invention, and the two solid-state batteries both correspond to a solid-state battery 200K of FIG. 11, the protective layers are unified between the two adjacent solid-state batteries. FIG. 19 illustrates a schematic sectional view of a solid-state battery group according to an eighth embodiment of the present invention. In FIG. 19, the two solid-state batteries are solid-state batteries having a parallel multiple battery structure and are connected so as to form a parallel connection. Thus, capacity of the solid-state battery group 500H can be increased without changing the battery voltage as compared to one solid-state battery having the parallel multiple battery structure.

Figure 20:
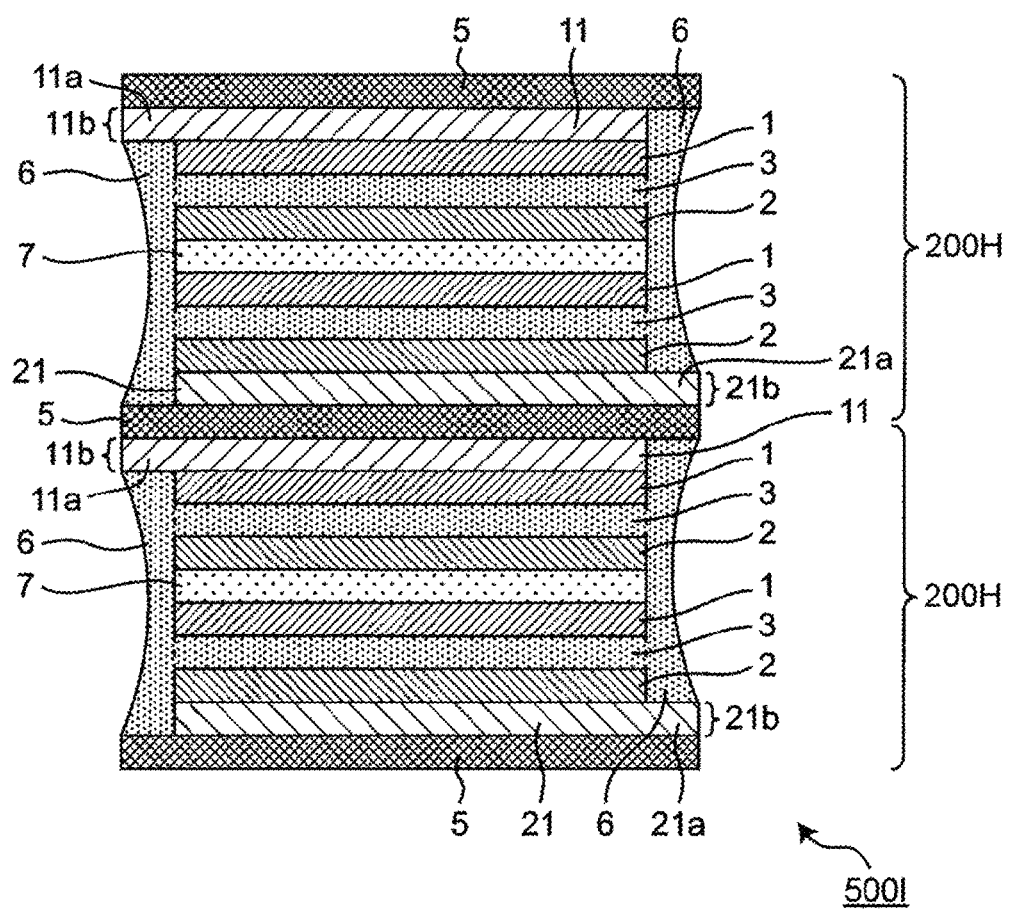
FIG. 20 illustrates a schematic sectional view of a solid-state battery group according to a ninth embodiment of the present invention.

Further, for example, although a solid-state battery group 500I of FIG. 20 includes only two solid-state batteries according to the present invention, and the upper and lower solid-state batteries both correspond to a solid-state battery 200H of FIG. 8, the protective layers are unified between the two adjacent solid-state batteries. FIG. 20 illustrates a schematic sectional view of a solid-state battery group according to a ninth embodiment of the present invention. In FIG. 20, two adjacent solid-state batteries have a series structure and are connected so as to form a parallel connection. As illustrated in FIG. 20, such two adjacent solid-state batteries can be arranged so that the stacking order of the positive electrode layer, the negative electrode layer, the solid electrolyte layer, and the like is aligned with each other. The part that the stacking order is aligned with each other means that the stacking order is the same in two adjacent solid-state batteries. Thus, electrodes on both upper and lower sides of the protective layer 5 between the solid-state batteries can be set to different electrodes (the upper side of the protective layer 5 is a negative electrode (2, 21) and the lower side thereof is a positive electrode (1, 11) in FIG. 20). Therefore, the solid-state battery group 500I can mutually absorb volume expansion and contraction during charging and discharging on both sides of the protective layer 5, and can further suppress deterioration of the battery.

Figure 21:
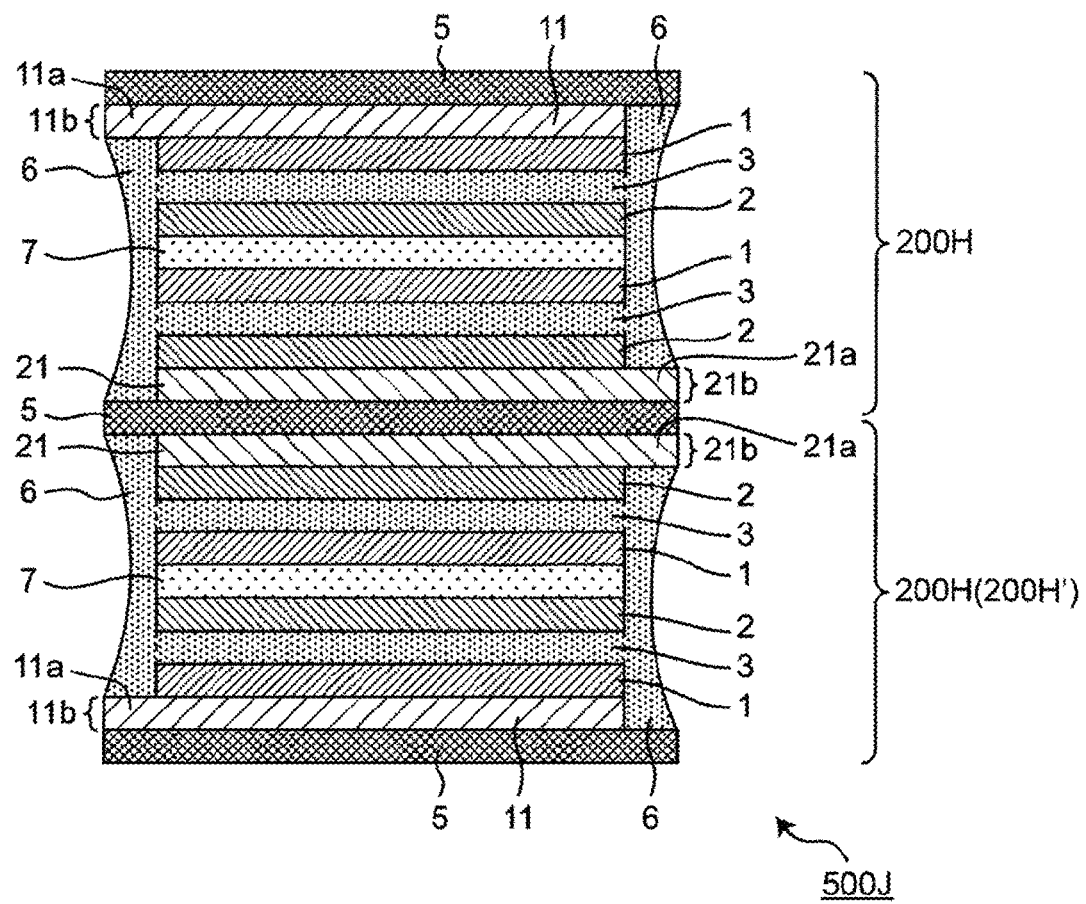
FIG. 21 illustrates a schematic sectional view of a solid-state battery group according to a tenth embodiment of the present invention.

Further, for example, although a solid-state battery group 500J of FIG. 21 includes only two solid-state batteries according to the present invention, and the two solid-state batteries both correspond to the solid-state battery 200H, the lower solid-state battery 200H' is installed vertically inversely in the stacking direction L with respect to the upper solid-state battery 200H, and the protective layers are unified between two adjacent solid-state batteries. In FIG. 21, two adjacent solid-state batteries have a series structure and are connected so as to form a parallel connection. As illustrated in FIG. 21, such two adjacent solid-state batteries can be arranged so that the stacking order of the positive electrode layer, the negative electrode layer, the solid electrolyte layer, and the like is reversed from each other. The part that the stacking order is reversed from each other means that the stacking order is reversed in two adjacent solid-state batteries. Thus, electrodes on both the upper and lower sides of the protective layer 5 between the solid-state batteries can be set to the same electrodes (negative electrodes (2, 21) in FIG. 21). Therefore, in the solid-state battery group 500J, positions of the electrical connection portions (21a) are concentrated, it is possible to suppress intrusion of moisture and the like from the electrical connection portions into the battery element 100, and deterioration of the battery can be further suppressed. A risk of poor connection can be reduced when connecting to an external terminal in practice.

[Method for Manufacturing Solid-State Battery]

The solid-state battery according to the present invention can be produced by a printing method such as a screen printing method, a green sheet method using a green sheet, or a composite method thereof. Hereinafter, the case where the printing method is employed will be described in detail, but it is clear that the method is not limited to this method.

A method for manufacturing a solid-state battery according to the present invention includes a step of forming an unfired stack by a printing method, and a step of firing the unfired stack.

(Step of Forming Unfired Stack)

In this step, using several types of pastes such as a positive electrode layer paste, a negative electrode layer paste, a positive electrode current collecting layer paste, a negative electrode current collecting layer paste, a solid electrolyte layer paste, a protective layer paste, a side surface reinforcing portion paste, a curved portion paste, a connection layer paste, and the like as ink, an unfired stack having a predetermined structure is formed on a substrate by a printing method. Note that the curved portion paste is a paste for forming a layer that is burnt down by sintering, and forms a dent in the curved portion.

The paste can be produced by wet-mixing a predetermined constituent material of each layer selected from the group consisting of a positive electrode active material, a negative electrode active material, an electron conductive material, a solid electrolyte material, an insulating substance, and a sintering additive with an organic vehicle obtained by dissolving an organic material in a solvent.

For example, the positive electrode layer paste contains a positive electrode active material, an electron conductive material, a solid electrolyte material, an organic material, and a solvent.

Further, for example, the negative electrode layer paste contains a negative electrode active material, an electron conductive material, a solid electrolyte material, an organic material, and a solvent.

Further, for example, the positive electrode current collecting layer paste and the negative electrode current collecting layer paste contain an electron conductive material, a sintering additive, an organic material, and a solvent.

Further, for example, the solid electrolyte layer paste contains a solid electrolyte material, a sintering additive, an organic material, and a solvent.

Further, for example, the protective layer paste contains an insulating substance, an organic material, and a solvent.

Further, for example, the side surface reinforcing portion paste contains a solid electrolyte material (and/or an insulating substance), a sintering additive, an organic material, and a solvent.

Further, for example, the curved portion paste contains an organic material and a solvent.

Further, for example, the connection layer paste contains a solid electrolyte material (and/or insulating substance), a sintering additive, an organic material, and a solvent.

The organic materials contained in the pastes are not particularly limited, but polymer compounds such as polyvinyl acetal resin, cellulose resin, polyacrylic resin, polyurethane resin, polyvinyl acetate resin, and polyvinyl alcohol resin can be used.

The solvent is not particularly limited as long as the organic material can be dissolved, and for example, toluene, ethanol, and the like can be used.

In the wet mixing, a medium can be used, and specifically, a ball mill method, a viscomill method, or the like can be used. On the other hand, a wet mixing method that does not use media may be used, and a sand mill method, a high-pressure homogenizer method, a kneader dispersion method, or the like can be used.

The substrate is not particularly limited as long as it can support the unfired stack, and for example, a polymer material such as polyethylene terephthalate can be used. Note that when the unfired stack is subjected to a firing step while being held on the substrate, the substrate used is one having heat resistance to firing temperature.

Figure 22:
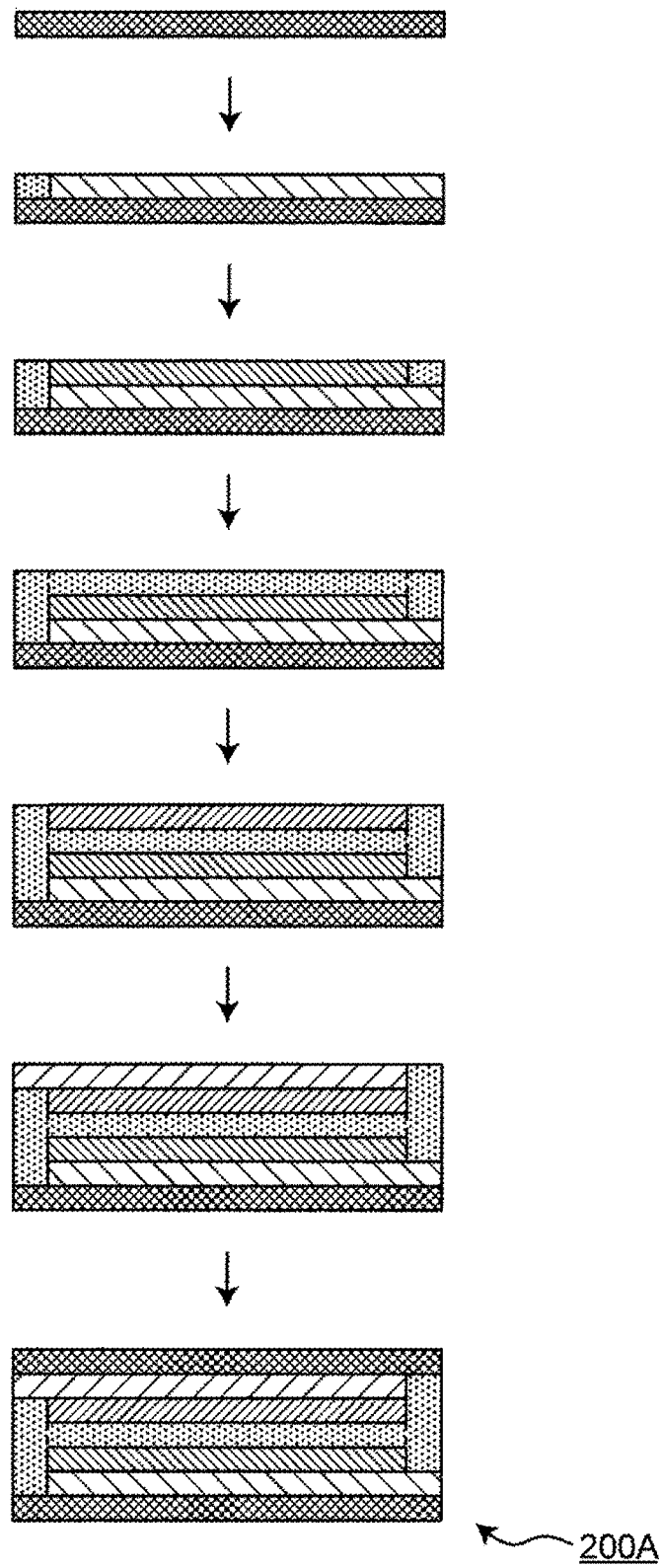
FIG. 22 is a flow chart for explaining an example of a step of forming an unfired stack in a method for manufacturing a solid-state battery according to the present invention.
Figure 23:
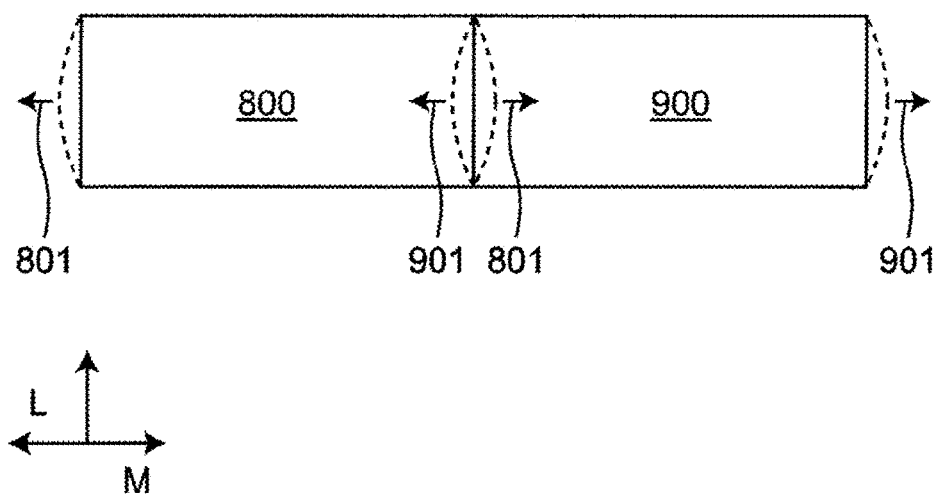
FIG. 23 is a schematic sectional view of a solid-state battery for explaining a mechanism of a short circuit caused by volume expansion, which is a problem in a conventional solid-state battery.

At the time of printing, print layers are sequentially stacked with predetermined thicknesses and pattern shapes, and an unfired stack corresponding to a predetermined solid-state battery structure is formed on the substrate. Specifically, when the solid-state battery 200A of FIG. 1A is manufactured, a plurality of print layers is sequentially stacked with thicknesses and pattern shapes as illustrated in FIG. 22, for example. In forming each print layer, a drying treatment (that is, a solvent evaporation treatment) is performed. FIG. 22 is a flow chart of a step of forming an unfired stack for explaining an example of the method for manufacturing a solid-state battery according to the present invention. The substrate is omitted in FIG. 22. Note that when the side surface reinforcing portion has a curved portion, a print layer made of the curved portion paste may be formed in the portion corresponding to a dent in the curved portion. In this case, by performing stacking by reducing the thickness of each print layer, it is possible to form a gradual increase or decrease in a curve depth.

After forming the unfired stack, the unfired stack may be peeled off from the substrate and subjected to a firing step, or the unfired stack may be subjected to a firing step while being held on the substrate.

(Firing Step)

The unfired stack is subjected to firing. The firing is carried out by removing the organic material in a nitrogen gas atmosphere containing oxygen gas, for example, at 500° C., and then heating in a nitrogen gas atmosphere, for example, at 550° C. to 1000° C. The firing may usually be performed while pressurizing the unfired stack in the stacking direction L (in some cases, the stacking direction L and the direction M perpendicular to the stacking direction L). The pressing force is not particularly limited, and may be, for example, 1 kg/cm$^2$ to 1000 kg/cm$^2$, particularly 5 kg/cm$^2$ to 500 kg/cm$^2$.

[Method for Manufacturing Solid-State Battery Group]

The solid-state battery group according to the present invention can be manufactured by a method similar to the above-described method for manufacturing the solid-state battery according to the present invention, except that an unfired stack corresponding to a structure of a predetermined solid-state battery group is formed in the step of forming the unfired stack.

Alternatively, the solid-state battery group according to the present invention can be produced by forming the unfired stack corresponding to the structure of the predetermined solid-state battery group by dividing into two or more and using them in combination. For example, in a case of manufacturing the solid-state battery group 500A of FIG. 12, in the above-described step of forming the unfired stack, two unfired stacks of an unfired stack corresponding to a structure of the solid-state battery 200G and an unfired stack corresponding to a structure of the solid-state battery 200G' are individually formed. The two unfired stacks are then used in combination before being subjected to the firing step. Specifically, the two unfired stacks are stacked or arranged and then assembled so as to correspond to the structure of the predetermined solid-state battery group. An obtained stack aggregate is subjected to the above-described firing step.

In this manner, by forming the unfired stack corresponding to the structure of the predetermined solid-state battery group by dividing into two or more and using them in combination, not only the specifications (for example, battery capacity) of the solid-state battery group demanded by the user can be met easily, but also the solid-state battery group can be easily manufactured (or processed).

A solid-state battery according to one embodiment of the present invention can be used in various fields where power storage is expected. The solid-state battery according to one embodiment of the present invention can be used, although merely examples, for electric, information, communication fields where mobile devices are used (for example, fields of mobile devices such as mobile phones, smartphones, smart watches, laptop computers and digital cameras, activity meters, arm computers, electronic paper, and the like), home and small industrial applications (for example, fields of power tools, golf carts, and domestic, nursing, and industrial robots), large industrial applications (for example, fields of forklifts, elevators, gantry cranes), transportation system fields (for example, fields of hybrid cars, electric cars, buses, trains, power assisted bicycles, electric motorcycle, and the like), power system applications (for example, fields of various power generations, road conditioners, smart grids, and general household power storage systems, and the like), medical applications (medical equipment fields such as earphone hearing aids), pharmaceutical applications (fields such as dose management systems), and IoT fields, space and deep sea applications (for example, fields of space probe, submersible research vehicle, and the like), and the like.

DESCRIPTION OF REFERENCE SYMBOLS

1: Positive electrode layer
1a: Electrical connection portion of positive electrode layer
1b: Exposed portion of positive electrode layer
2: Negative electrode layer
2a: Electrical connection portion of negative electrode layer
2b: Exposed portion of negative electrode layer
3: Solid electrolyte layer
5: Protective layer
6: Side surface reinforcing portion
7: Connection layer
10: Battery constitutional unit
11: Positive electrode current collecting layer
11a: Electrical connection portion of positive electrode current collecting layer
11b: Exposed portion of positive electrode current collecting layer
21: Negative electrode current collecting layer
21a: Electrical connection portion of negative electrode current collecting layer
21b: Exposed portion of negative electrode current collecting layer
100: Battery element
200 (200A, 200B, 200C, 200D, 200E, 200F, 200G, 200H, 200I, 200J, 200K, 200G', 200H', 200I'): Solid-state battery
500 (500A, 500B, 500C, 500D, 500E, 500F, 500G, 500H, 500I, 500J): Solid-state battery group

The invention claimed is:

1. A solid-state battery comprising:
a battery element that includes one or more battery constitutional units, each battery constitutional unit including a positive electrode layer and a negative electrode layer facing each other and a solid electrolyte layer arranged between the positive electrode layer and the negative electrode layer;
a first protective layer covering an upper surface of the battery element, the first protective layer having a first protruding portion that protrudes past the battery element in a sectional view of the solid-state battery;
a second protective layer covering a lower surface of the battery element, the second protective layer having a second protruding portion that protrudes past the battery element in a sectional view of the solid-state battery; and
a side surface reinforcing portion that reinforces a side surface of the battery element and extends between the first protruding portion of the first protective layer and the second protruding portion of the second protective layer,
wherein the side surface reinforcing portion is in direct contact with side surfaces of each of the positive electrode layer, the negative electrode layer, and the solid electrolyte layer, and
wherein the first and second protective layers include an insulating substance other than resin.

2. The solid-state battery according to claim 1, wherein an outer peripheral surface of the side surface reinforcing portion is curved inward in an in-plane direction perpendicular to a stacking direction of each layer of the battery constitutional unit in the sectional view of the solid-state battery.

3. The solid-state battery according to claim 2, wherein the side surface reinforcing portion is an integrally sintered body together with the side surface of the battery element covered by the side surface reinforcing portion.

4. The solid-state battery according to claim 1, wherein the first protective layer and the second protective layer are integrally sintered bodies together with the upper and lower surfaces of the battery element.

5. The solid-state battery according to claim 1, wherein the first protective layer is in direct contact with the upper surface of the battery element, and the second protective layer is in direct contact with the lower surface of the battery element.

6. The solid-state battery according to claim 1, wherein two adjacent layers of all the layers of the battery element are jointly sintered bodies.

7. The solid-state battery according to claim 1, wherein the insulating substance is an insulating inorganic substance.

8. The solid-state battery according to claim 7, wherein the insulating inorganic substance is one or more materials selected from:
    quartz glass,
    composite oxide-based glass that is a combination of $SiO_2$ and one selected from at least one of PbO, $B_2O_3$, MgO, ZnO, $Bi_2O_3$, $Na_2O$, and $Al_2O_3$,
    alumina,
    cordierite,
    mullite,
    steatite, and
    forsterite.

9. The solid-state battery according to claim 1, wherein the insulating substance has an ionic conductivity of $1\times10^{-7}$ S/cm or less.

10. The solid-state battery according to claim 1, wherein the insulating substance has an electron conductivity of $1\times10^{-7}$ S/cm or less.

11. The solid-state battery according to claim 1, wherein a thickness of a thickest portion of the protective layer is 500 μm or less.

12. A solid-state battery group comprising:
    two or more solid-state batteries according to claim 1, wherein two solid-state batteries among the two or more solid-state batteries that are adjacent to each other in a stacking direction of the layers of the battery constitutional unit are integrally sintered bodies with at least one of the first protective layer and the second protective layer of the two solid-state batteries that are adjacent to each other interposed therebetween.

13. The solid-state battery group according to claim 12, wherein the two adjacent solid-state batteries each have a parallel structure and are connected in parallel.

14. The solid-state battery group according to claim 12, wherein
    the two adjacent solid-state batteries each have a series structure and are connected in parallel, and
    the two adjacent solid-state batteries are arranged in a manner that a stacking order of the positive electrode layer, the negative electrode layer, and the solid electrolyte layer are aligned with each other.

15. The solid-state battery group according to claim 12, wherein
    the two adjacent solid-state batteries each have a series structure and are connected in parallel, and
    the two adjacent solid-state batteries are arranged in a manner that a stacking order of the positive electrode layer, the negative electrode layer, and the solid electrolyte layer are reversed from each other.

16. The solid-state battery group according to claim 12, wherein only one of the first protective layer and the second protective layer of the two solid-state batteries that are adjacent to each other is interposed between the two adjacent solid-state batteries.

17. The solid-state battery group according to claim 12, wherein both the first protective layer and the second protective layer of the two solid-state batteries that are adjacent to each other are interposed between the two adjacent solid-state batteries.

* * * * *